(12) United States Patent
Rudnitsky et al.

(10) Patent No.: US 11,353,856 B2
(45) Date of Patent: Jun. 7, 2022

(54) SYSTEM AND METHOD FOR FLEXIBLE MANUFACTURING

(71) Applicant: Arrival Limited, London (GB)

(72) Inventors: Dmitry Rudnitsky, London (GB); Alexey Vovchenko, London (GB); Yury Sinkin, London (GB); Matvey Bryksin, London (GB); Andrey Timerbaev, London (GB); Arina Baranova, London (GB); Kirill Krinkin, London (GB)

(73) Assignee: Arrival Limited, London (GB)

( * ) Notice: Subject to any disclaimer, the term of this patent is extended or adjusted under 35 U.S.C. 154(b) by 245 days.

(21) Appl. No.: 16/843,549

(22) Filed: Apr. 8, 2020

(65) Prior Publication Data

US 2020/0319630 A1 Oct. 8, 2020

(30) Foreign Application Priority Data

Apr. 8, 2019 (GB) .................................. 1904979

(51) Int. Cl.
*G05B 19/418* (2006.01)
*B25J 9/16* (2006.01)
(52) U.S. Cl.
CPC ...... *G05B 19/41865* (2013.01); *B25J 9/1605* (2013.01); *G05B 19/41885* (2013.01);
(Continued)
(58) Field of Classification Search
None
See application file for complete search history.

(56) References Cited

U.S. PATENT DOCUMENTS

| 2006/0064289 A1 | 3/2006 | Walacavage et al. |
| 2009/0112350 A1 | 4/2009 | Yuan et al. |
(Continued)

FOREIGN PATENT DOCUMENTS

| EP | 2669824 | 12/2013 |
| WO | WO2017141070 | 8/2017 |
| WO | WO2018173656 A | 9/2018 |

OTHER PUBLICATIONS

Barrabes, M et al., "Object Data Base, AI and Cad-Cam: Application to the Process Ascending Generation (PAG) Concept", Proceedings of the Annual Computers in Design, Manufacturing and Production Conference (COMPEURO), Paris-Evry, May 24, 27, 1993, vol. -, May 24, 2993, pp. 320-329.
(Continued)

*Primary Examiner* — Sean Shechtman
(74) *Attorney, Agent, or Firm* — Lee & Hayes, P.C.

(57) ABSTRACT

The system performs a process for creating robotic control code for manufacturing products. A Designer UI displays virtual parts and receives inputs for processing and assembling the virtual parts that are required to create a virtual product. The designer identifies options for processing and assembling the virtual parts which are displayed on the user interface. The robot abilities and the options are selected to optimize a metric of the product manufacturing. The inventive toolset produces the robot control codes for performing a sequence of robotic abilities with the selected options to product the product. The robot control codes are used by a simulator which manipulates virtual robots and virtual parts to create a virtual product to check the robot control code. The verified robot control code is used to control real robots to create the product.

12 Claims, 18 Drawing Sheets

(52) U.S. Cl.
CPC .............. *G05B 2219/32254* (2013.01); *G05B 2219/33286* (2013.01); *G05B 2219/50391* (2013.01)

(56) References Cited

U.S. PATENT DOCUMENTS

2014/0257548 A1 9/2014 Bachrach et al.
2018/0365370 A1 12/2018 Egan et al.

OTHER PUBLICATIONS

Extended EP Search Report for corresponding EP Patent Application No. 20168808.2 dated Sep. 10, 2020, 15 pages.
Santochi, M et al., "Computer-Aided Planning of Assembly Operations: The Selection of Assembly Sequences", Robotics and Computer Integrated Manufacturing, Elsevier Science Publishers BV, Barking, GB, vol. 9, No. 6, Dec. 1, 1992, pp. 439-446.
Sreeramula, Dowluru et al, "Integration of computer aided design and computer aided manufacturing using STEP data exchange standard", 2016 10th International Conference on Intelligent Systems and Control (ISCO), IEEE, Jan. 7, 2016, pp. 1-6.
Steele, J et al., "An operations planner for integrated shop floor material processing and material handling operations", Proceedings of the 2001 IEEE International Conference on Robotics and Automation, ICRA 2001, Seoul, Korea May 21-26, 2001, New York, NY, IEEE, US, vol. 3, May 21, 2001, pp. 3133-3138.
GB Examination Report for corresponding GB Patent Application No. 1904979.0 dated Sep. 29, 2021, 4 pages.
GB Combined Search and Examination Report for corresponding GB Patent Application No. 1905513.6 dated Oct. 21, 2019, 8 pages.
GB Combined Search and Examination Report for corresponding GB Patent Application No. GB 1904979.0 dated Oct. 9, 2019, 7 pages.

Base Functions

Short description what is the base functions

1. Execute_trajectory

Short description about what function does

```
1  Execute_trajectory {
2      "in": {"trajectory_to_execute":"execute_trajectory"},
3      "dependencies": {"Plan_trajectory_to_points":"success"}
4  }
```

Required 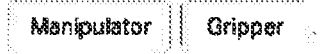

2. Put

Short description about what function does

```
1  Put {
2      "in": {"trajectory_to_execute":" put _trajectory"},
3      "dependencies": {"Plan_trajectory_to_points":"success"}
4  }
```

Required 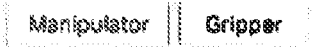

3. Insert

Short description about what function does

```
1  Insert {
2      "in": {"trajectory_to_execute":"insert_trajectory"},
3      "dependencies": {"Plan_trajectory_to_points":"success"}
4  }
```

Required 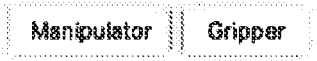

Fig. 5

```
//pick specification
pick {
  "in": {"detail":"detail_instance", "gripper":"gripper_instance"},
  "providers": {"robot_provider": "robot_provider1", "gripper_provider":
"gripper_provider1"}
}
:rules:
calculate_grasp_cartesian_trajectory {
  "in": {"gripper":"gripper_instance","detail":"detail_instance"},
  "out": {"cartesian_trajectory":"pick_way_points"}
}
-> plan_trajectory_to_points {
  "in": {"points_to_move_through":"pick_way_points"},
  "out": {"result_motion_plan":"pick_trajectory"},
  "dependencies": {"calculate_grasp_cartesian_trajectory":"success"}
}
```

Fig. 6

1. Assembling the central structure
    Need connectors (10 pcs), interface structure, extruded aluminum profile (extrusion) (5 pcs)
    1.1. Place the connectors in the front interface structure (join.insert)
    1.2. Bolted (5 pcs.) Connectors to the interface structure (join.fasten)
    1.3. We place a profile from extruded aluminum (extrusion) (5 pcs) in connectors – (join.extrusion)
    1.4. Place the connectors into the back interface structure
    1.5. Bolted (5 pcs.) connectors to the back interface structure
    1.6. We attach the connectors from the back interface structure to the part obtained in step 1.3.
    1.7. Bolted extruded aluminum profile and connectors (10 times)
    1.8. Fill glue with injections into the hole of the back interface structure
2. Mount the floor panel
    Need glue, floor panel
    2.1. Apply glue to the floor panel or to the frame of the central structure
    2.2. Place the floor panel on the central structure (move.laydown)
    2.3. flip the panel (move.flip)
    2.4. screw the floor panel to the central structure with bolts (join.fasten) (6 pieces)
3. Turn over (move.upsidedown)
4. Repeat operations for the lower part (as in 2.1 - 2.4)
    4.1. Connectors are placed in the interface structure (4 connectors) (join.insertonnectors)
    4.2. Screw connectors with bolts (4 bolts) (join.fasten)
5. Mount the frontal subframe to the central structure
    5.1. mount the subframe (fastened together) to the central structure
    5.2. bolted (2 bolts)
    5.3. fix with glue
6. Mount the rear subframe to the central structure
    6.1. mount the subframe (fastened together) to the central structure
    6.2. bolted (2 bolts)
    6.3. fix with glue
7. Mount the front wheel axle
    7.1. insert connectors into the central structure from the front side
    7.2. insert the front wheel axle into the central structure from the front side
    7.3. bolted (2 bolts)
    7.4. glue (insert glue into the holes)
    7.5. cut connections at subframe
8. All steps described in point 7 are repeated for the back side of the construction
9. Mount the front limiters (front enclosure)
    9.1. Lift the entire assembly (100 kg)
    9.2. bring the front enclosure
    9.3. Bolted
10. Repeat operation 9.1-9.3 for rear enclosure
11. Mount the front drive
    11.1. Mount bushings (bushing)
    11.2. Screw the hub bolts
    11.3. raise the drive
    11.4. bolted drive
12. Paragraphs 11.1- 11.4 repeat for the rear-wheel drive
13. Connecting the cable front and rear drive
14. We mount front protection
    14.1. Lift the Protection cover
    14.2. Screw the protection cover to the main chassis assembly.
15. Repeat 14.1-14.2 for the rear protection cover

Fig. 8

SYSTEM AND METHOD FOR FLEXIBLE MANUFACTURING

This Application claims priority to GB patent application number 1904979.0, filed Apr. 8, 2019, which is incorporated herein by reference.

BACKGROUND

In conventional robotic manufacturing for products, the design, part movement and machining operations, parts assembly and optimization of these product fabrication processes, must be determined before running the robotic manufacturing process. This processes can be very complex and can take a significant amount of time to finalize before production. In addition to simply producing products, the manufacturing processes should also be optimized based upon a criteria such as: cost, time to market, parallel assembly, equipment load, energy savings, production strategy advantages, etc.

The process for translating a basic product design into a ready-for-sale product is very complex and calls for many crucial design choices related to all aspects of the product including materials, tooling, machinery, part assembly processes, component design, production implementation, etc. A simplified process includes the following key stages: 1. A product demand identification phase is commonly done by marketing department, which formulates the general requirements to the product and results in a functional design requirements specification document. 2. Project design is implemented which includes a listing all modules and components with featuring specified in the functional design requirements specification document. 3. A technologist designer will then map the design details to the available technologies and tooling so that the feasibility of the product manufacturing schema is completely verified. 4. After the design is verified and the tooling, technologies and resources are available, manufacturer might start the creation of the physical product. The design of these manufacturing processes with robots has historically been manually planned which has resulted in long preparation times prior to production.

FIG. 1 illustrates a diagram of a design verification process which uses available technologies, tools, materials, supplies and other resources to create the product design. The planning and design roles are commonly distributed between different human experts on each stage. In the illustrated example, the design team can include: a designer 103, a technologist 105 and a factory expert 107 who use the available knowledge including: the available technologies 111, the available tools 113, material provisioning 115 and resources provisioning 117 to perform their roles in the product manufacturing design process.

The designer 103 can use computer aided design (CAD) and computer aided engineering (CAE) tools to create a product design based upon specific product requirements. The product design can include details such as: materials, fasteners, coatings, adhesives, and electronic adjustments. When a proposed design is complete, expensive analyses, resource available, and experiments may be necessary to verify the design choices. If the designer sees that the product requirements might not be satisfied, the designer can request adjustments to the product design. Through an iterative process, the designer can eventually create a product design that meets the product requirements and the product design can forwarded to the technologist 105.

The technologist 105 can use computer aided manufacturing tools (CAM) and the available knowledge resources to determine if the required product fabrication tooling technologies are available in a factory. If the technologist 105 sees that design cannot not be fabricated due to lack of tools or technology in the factory, the technologist 105 may ask the designer 103 to redesign the product. Alternatively, the technologist 105 might also require factory modifications or request factory equipment upgrades. The technologist's 105 work may also be an iterative process. Once the technologist 105 determines that the product design only requires fabrication equipment available in the factory, the factory technology approved design is forwarded to the factory manufacturing authority 107.

The factory manufacturing authority 107 can review the product design and request a technology correction, request the development of a new technology according to the available resources, issue request to upgrade the factory equipment and/or technology support to the management, or find out supply channels for materials provisioning. Once the factory authority approves the design, a proof of concept prototype of the product can be created before the design is manufactured. These concept prototypes can be built and adjustments can be made until the factory manufacturing authority 107 is satisfied with the product. Product production including creation and assembling of the product can start once all of the factory processes are set up and all the resources are available at the factory.

This process can result in product technological documentation for production of the product which can include: route sheets, flow charts, standard equipment charts, production instructions, shop data statements, equipment data statements, and materials data statements. The technological documentation can be produced for all types of work associated with production of the product. Route sheets can be composed for all stages in the preparation of working documentation and can contain a description of the production process for the manufacture during all product fabrication operations in a specific sequential process and specify the equipment, instrumentation, materials, and labor expenditures. Flow charts can provide a graphic or schematic representation of the technology for the manufacture of the product, and include component parts data, assembly unit data, and materials data. The production instructions include operational methods, methods for control of a production process, directions for the use of equipment or instruments, and safety measures are specified in. Shop data statements contain information on the routing of items through the manufacturing factory. Equipment data statements can contain a listing of the accessories and tools necessary for manufacturing an item. Materials data statements can include detailed and summary statements of materials expenditure rates.

The prior art technological documentation required for the product production planning is an extremely complex problem and the described processes for design, approval, verification are very time consuming. For example, it can take five to six years to design a car and get the factory manufacturing ready for car production. When a new car is purchased, the design of the car can be five or more years old. In most cases, a car factory is specifically oriented to the particular vehicle model production and not flexible in production re-orientation and modification of the product. If there are unexpected changes at the factory environment or product requirements, the described product fabrication design process must be re-done.

Thus, there is a great need for an improved system which can simplify product designs and automatically determine robotic manufacturing processes for the product production.

SUMMARY OF THE INVENTION

The present invention is directed towards an automated Design Flow manufacturing process that allows the initial product design, technology process and manufacturing designs to be modified in real-rime. More specifically, the inventive system performs: verification, testing and finally planning of robotic and software operations. The inventive system can also provide immediate feedback to designers so that they can know if their designs are suitable for production. For example, the designer draws a part or an assembly and the inventive system can immediately provide feedback so the designer understands how the product can be produced, how much the product will cost and what properties the manufactured product will have.

The inventive process can be controlled by computer software and can provide the designer with product design information based upon different possible product manufacturing options such as: estimated product costs, product manufacturing times, product weights, etc. For example, the inventive process can analyze a product design using existing tooling and a product design that requires new processes. If new technology development is required, there can be time delays due to the new machinery delivery, installation, and startup times and this can increase the initial costs to the product. However, it some situations the new technology development request might be strategically beneficial in the long term. If the new technology development has more benefits than using the available fabrication equipment, the designer user can request new technology factory equipment upgrades.

The inventive process can perform various tasks for automating the product design process. In an embodiment, the system can determine the character of the product, to determine what design and production methods are appropriate. The system can subject the product to a product function analysis, so that all design decisions can be made with full knowledge of how the item is supposed to work so that the designed fabrication process will produce products that function as required. The system can run a design-for-producibility-and-usability study to optimize the product design by determining if the product can be improved without impairing the required functionality.

The system can design a manufacturing process appropriate for the product's particular character, correspondingly to the technologies applicable in the factory. This method involves creating a suitable components creation, manipulation, refinement and assembly sequence, identifying sub-assemblies, integrating quality control, and designing each part so that its structure and design are compatible with the assembly method. This system can create factory optimized products, adapted to the specific abilities of any factory. The system can create a product manufacturing schema and determine the associated dependent processes. The system can optimize the existing technological process capabilities of any factory. The system can create a set of suggested factory upgrades, accordingly with the product design and technological processes selected for a proposed product fabrication. The system can add new products to the production line for parallel manufacturing with existing products being manufactured. The system can adapt the existing product for production at another factory. The system can set the requirements to the new factory according to the optimal design and selected technological processes/dependencies. The benefits of this system can include a factory system that fully involves workers in the production strategy, operates on minimal inventory, and is integrated with vendors' methods and capabilities.

The innovation is an improved method for creating a product from drawing the design in CAD tools to assemble the product in hardware. The inventive solution has various benefits including: reducing the previously known sequences from product design to production and minimizes the required number of roles and dependencies. Thereby, the inventive system reduces the time to market and cost per unit.

The present invention provides a method for manufacturing a product comprising a series of process steps. A Designer UI analyzes a product design having parts, assemblies, and product requirements. The Designer UI is coupled to databases which store information describing the robotic tooling and the robot tooling abilities that are available in a factory. The Designer UI determines a sequence of robot tooling abilities using the available robot tooling abilities to move, machine and assemble the parts and the assemblies to create the product that meets a set of product requirements. The Designer UI also determines the available manufacturing options for the robot tooling for producing the product. The Designer UI has a UI which displays the sequence of robot tooling abilities for producing the product, and the options for the robot tooling abilities. The designer can select some of the options through the user interface of the design computer. Based upon the product design, the product requirements and the options selected, the Designer UI creates tool control codes for producing the product from the sequence of abilities by the robot tooling. The tool control codes are used for simulating the fabrication of a virtual product by virtual robot tooling with the tool control codes for the sequence of abilities and the options that were selected on a Simulator. A Simulator can be used to verify the control codes for the sequence of abilities correctly manufactures the product. If errors are detected and identified, corrections can be input and applied to the tool control codes. Once the tool control codes pass the simulation, they can be used on the actual robotic tooling to begin production of the product.

The Designer UI can compare different sequences of abilities using the robot tooling for producing the product that meets the product requirements. The UI can display the alternate sequence of abilities and the UI can allow the user to select the alternate sequence of abilities and the Designer UI can create alternate control codes for producing the product. The Designer UI can compare different fabrication processes for a product with the different control codes for the alternate sequence of abilities and the options that were selected. The differences between the different robot control codes can be displayed and quantified by key performance indicators (KPIs) such as product costs, production time per product, product weight, product performance, etc. The user can compare the KPIs and select a fabrication process and corresponding robot control code based upon the prioritized KPI.

When a product is modified or redesigned, the new design information can be analyzed and processed by the designer tool. A modified sequence of abilities using the robot tooling for producing the modified product that meets a set of modified product requirements can be determined by the designer tool. Additional options for the new product design can be determined and displayed on the UI. The user can select some of the modified options through the user interface of the design computer and the Designer UI can create new modified control codes for producing the modified product. The modified control codes can be retested by the Simulator for the fabrication of a modified virtual product by virtual robot tooling using the modified options that were selected on a Simulator. Detected errors are detected and corrected. Once the Simulator verifies the control codes for the modified sequence of abilities The control codes can be applied to the robot tooling to manufacture the actual modified product.

BRIEF DESCRIPTION OF THE DRAWINGS

FIG. 5 illustrates a user interface listing base functions and robot control code.

FIG. 6 illustrates an example of robot control code for a robotic pick operation.

FIG. 8 illustrates a sequence of abilities for tasks for assembling a central console assembly.

DETAILED DESCRIPTION

The invention system is directed towards a method for flexible product manufacturing using a software defined product Design Flow approach. Computer-integrated manufacturing (CIM) is the manufacturing approach of using computers to control the entire production process. CIM allows individual processes to exchange information with each other and initiate actions which can change the way products are produced. Although manufacturing can be faster and less error-prone by CIM, this process also has the ability to create automated manufacturing processes. The inventive system and method can be used to automate the product design and the technology verification methods in order to shorten the time to market cycle for new or updated products. The inventive system can also optimize and shorten the time required for factory readiness for product production which reduces product costs and improves factory efficiency.

A flexible manufacturing system is able to produce goods and is able to process changes in the product being manufactured, both in type, design, and quantity. Machines and computerized systems in the factory are configured to manufacture various part designs and handle varying levels of production. A flexible manufacturing system gives product manufacturers an advantage with the ability to quickly change a manufacturing environment to improve process efficiency and lower production cost.

Figure 1:
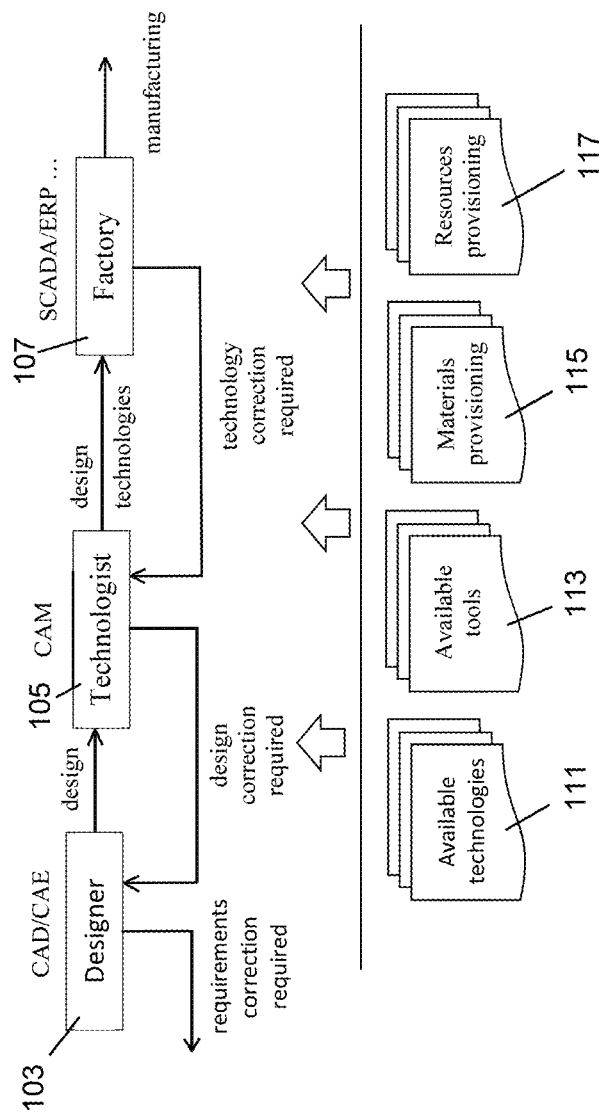
FIG. 1 illustrates a flowchart for creating robot control code for a manufacturing system.
Figure 2:
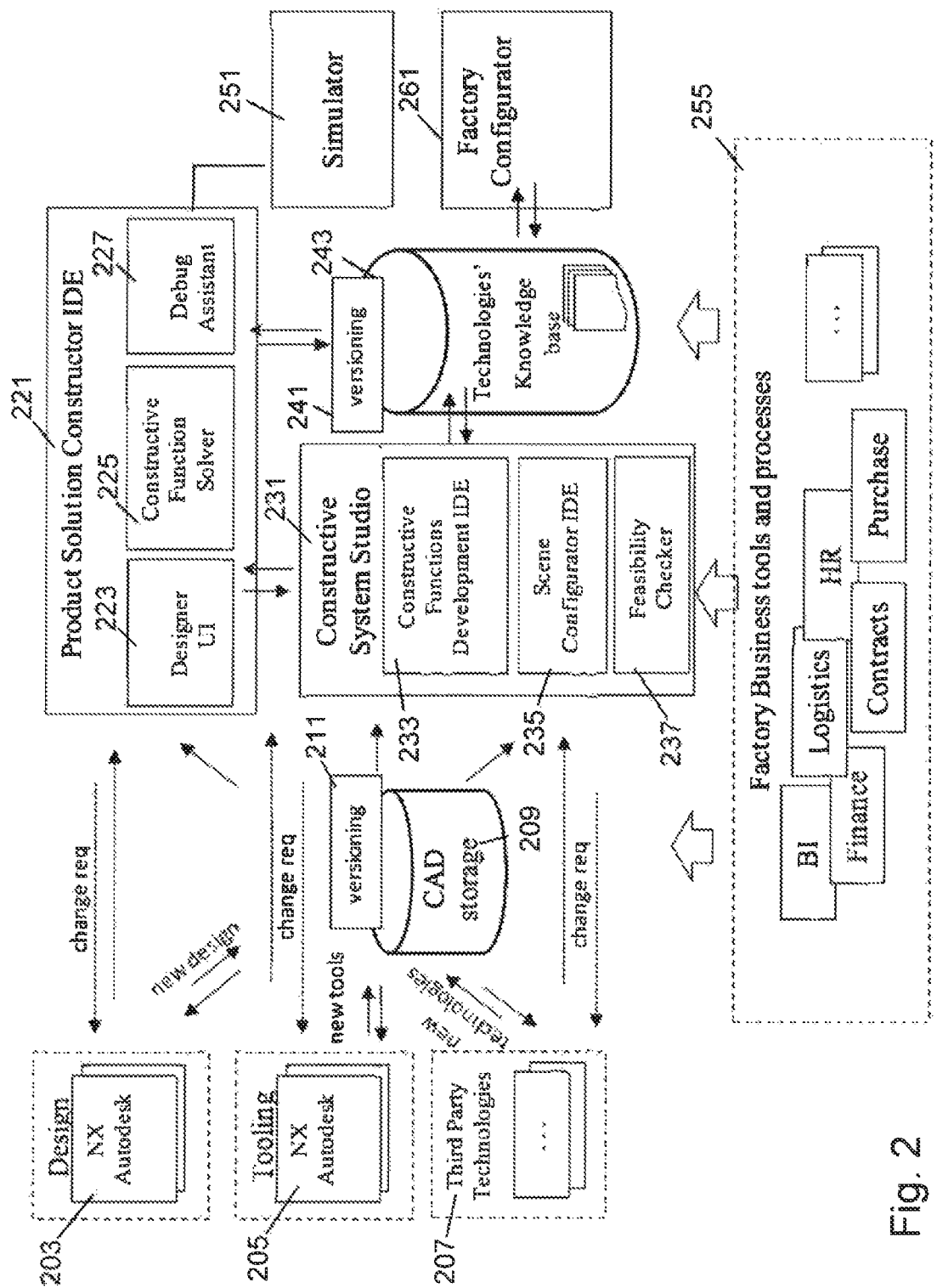
FIG. 2 illustrates a block diagram of an embodiment of a system for creating robot control code.

With reference to FIG. 2, a bock diagram of an embodiment of a system for product manufacturing is illustrated. Design 203 can be created with CAD tools. The Design 203 is used as initial information for the Design Flow process within the factory. Besides the technical and physical parameters, the product design can include the environmental and financial requirements of the factory. CAD Storage 209 is the digital storage subsystem, which saves the design projects from the design 203. To support the versioning control and intermediate formats storage, versioning software 211 can be used with the storage 209 and versioning software 241 can be used with the technology knowledge base 243.

The Product Solution Constructor (PSC) Integrated Development Environment (IDE) 221 is a software application that provides comprehensive facilities to computer programmers for software development which includes a Designer UI 223, a Constructive Function Solver 225 and a Debug Assistant 227. The PSC IDE 221 can also include a source code editor, build automation tools, and a debugger. The PSC IDE 221 can also have intelligent code completion and contain a compiler, an interpreter, a version control system, a graphical user interface (GUI), etc. The PSC IDE 221 can have a Designer UI 223 which interacts with a Constructive System Studio (CSS) 231 which is a toolset, which analyzes the design projects and product manufacturing and determines which construction systems (assembly parts) are needed and able to design them. According to the list of defined dependencies, the CSS 231 can automatically create a backlog of new technology development tasks. Constructive Function is a simple invariant action that can be performed by a physical resource. Constructive Function also could be a complex sequence of actions that can be performed by physical resources or virtual services. Constructive System contains the physical resources to perform assigned Constructive Function. Constructive System might include a complex sequence of Constructive Functions with its resources. In the illustrated embodiment, the CSS 231 can contain two IDEs: a Constructive Functions Development Integrated Development Environment Tool (CFD IDE) 233 and a Scene Configurator Integrated Development Environment Tool (SC IDE) 235. The CSS 231 can also include a Feasibility Checker 237 which is a tool, which is aimed to verify dependencies and check the consistency of the product design and feasibility of the product creation from the technological process standpoint. Feasibility Checker 237 can verify and output the manufacturing process as a sequence of construction functions for a product.

The system can input tooling information through a user interface of a tooling module 205 which can process and format the tooling information. The tooling information can be stored in the storage 209 and provided to the CSS 231. When new tools are added to the factory, the described process can be used for the new tooling information. When product design changes are made, the CSS 231 can issue a change request to the tooling module 205. The tooling module 205 can respond to the change request by providing modifications to the tooling information which are stored in storage 209 and shared with the CSS 231.

In some cases, the system can obtain new technology information from third party technologies 207. For example, some of the product manufacturing can be performed by third party service which is not part of the factory, or the third party technology can be proprietary machinery which is maintained by the third party support services. Thus, the system may have to provide parts or assemblies in a specific condition in order for the third party to perform the additional processing. The third party technology information can be stored in the storage 209 and shared with the CSS 231. When changes are requested by the CSS 231 the third party technologies 207 can respond by providing modified information for the third party technologies which are stored in storage 209 and shared with the CSS 231. The system can also receive information from other external sources 255 which can include BI, Finance, Logistics, Contracts, HR, Purchasing, etc. The external sources 255 information can be transmitted to storage 209, the CSS 231 and the technologies knowledge base 243.

The Constructive Functions Development (CFD) IDE 233 allows the developer to write basic abstract construction functions for different types of robotic equipment, combine them into high-level functions which can also be construction functions. The CFD IDE 233 can verify quality of the code for performing the robotic functions through a Simulator or other verification means. The CFD IDE 233 also stores and displays requests for writing and debugging new required functions. The base functions of the tool and the high level functions are displayed in a user interface (UI) of the CFD IDE 233 to the designer's computer as a kind of connection. It should be noted, that in some embodiments, part of the assembling functions might be performed by humans instead of robots, the CFD IDE 231 will include the human readable execution scenario generation functionality.

A Constructive Function Solver 225 and a Debug Assistant 227 are also components of the PSC IDE 221. The Constructive Function Solver 225 is a subsystem of the PSC IDE 221 this is tool that stores and manages rules and provides the execution plan for a Constructive System. The Designer UI 223 might request some manufacturing technology process scenario part to be provided, the Constructive Function Solver 225 searches for corresponding library program for manufacturing technology process scenario part in the knowledge DB 243. The search may or may not result in previously stored manufacturing processes. If the requested manufacturing scenarios are found, they are represented as options on a palette or dropdowns menu of the UI of the Designer UI 223. The Constructive Function Solver 225 can be analogous of a pre-processor, compiler and linker in the software programming languages.

The Debug Assistant tool 227 is also a subsystem of PSC IDE 221. The main task of the Debug Assistant tool 227 is to provide a feedback to the designer through the UI of the Designer UI 223 and provide possible options to correct the detected errors. The Debug Assistant tool translates the outputs of the Constructive Function Solver to the human readable error reports.

The product manufacturing process can start with a demand identification phase where general requirements for the product are determined and converted into a product requirements specification. Based upon the product requirements specification, the product design 203 can be created with CAD tools and CAD document such as an NX file. The product design 203 can be stored in the CAD storage 209.

The PSC IDE 221 analyzes the product design and determines the characteristics of the product, to identify the most appropriate design and production methods. The PSC IDE 221 determines and lists all modules and components for the product with the required features that are specified in the product design 203. Inputs for the Constructive Functions Development IDE 233 can include: technical parameters of the produced goods, requirements for materials, requirements for equipment, costs, spacing, integration limits/plans, construction systems' alternatives available on the market, etc. Outputs for the CFD IDE 233 can include Constructive System formal specifications along with key performance indicator (KPI) estimates. The outputs from the CFD IDE 233 are stored in a database such as the technologies knowledge base 243 and verification of the stored recently/imported CS.

The Factory Configurator tool 261 can receive factory information from the technologies knowledge base 243. The Factory Configurator tool 261 can have a UI that allows designers to plan, support and optimize the production in each factory location according to the factory tools and tool layout. In some cases, the robotic operations like product delivery or product dimension checking might be performed by human operators or controlled by humans. The Factory Configurator tool 261 can analyze the manufacturing tooling availability and propose possible tooling options and dependencies. The Factory Configurator tool 261 can request additional tooling or tooling/technology modifications or providing human interaction with the product production.

The PSC IDE 221 then determines a plurality of different product design choices and a plurality of different manufacturing methods and manufacturing options for creating different product designs which each meet the product requirements which can be displayed on a user interface UI of the Designer UI 223. During the analysis of the product design 203 the PSC IDE 221 can perform a product function analysis, so that all design decisions can be made with full knowledge of the advantages and disadvantages of each of the different possible product configurations. Rather than reviewing a single product design, a designer can compare multiple product designs and manufacturing processes and options as displayed on the UI of the Designer UI 223.

The PSC IDE 221 can also carry out a design-for-producibility-and-usability study to determine if the product design can be improved without impairing functioning. The PSC IDE 221 can design manufacturing processes which can be appropriate to the product's particular character. For example, the PSC IDE 221 can create suitable welding, cutting, molding and assembly sequences, identifying sub-assemblies, integrating quality control, and designing each part of the product so that the quality is compatible with the assembly methods specified by the PSC IDE 221.

A design project might be a vehicle chassis CAD design 203. The CAD model design 203 must be verified for feasibility on current location using the proposed fabrication technologies from the CAD design model. The PSC IDE 221 can compare products manufactured using existing robotic tooling in a factory to products made with new robotic tooling which can be installed in the factory. Further, the PSC IDE 221 can create product designs and corresponding manufacturing processes for a factory system that can be optimized based upon other factors such as: fully involving factory workers in the product production strategy, product production processes that most efficiently operate on minimal inventories, effective load of the workshop equipment, components storage, intra-logistics and product production designs that are integrated with vendors' methods and capabilities.

If the product specification requires using the existing tooling in a factory, the PSC IDE 221 can create product designs that are adapted to the factory abilities. These product designs can then be used by the PSC IDE 221 to create product manufacturing schemas and determine the dependencies. The PSC IDE 221 can also optimize the existing technological processes for the product manufacturing based upon a desired production goal of reduced product cost, faster production time, etc.

If the product's manufacturing process specification demands for additional tooling to be added to a factory, the PSC IDE 221 can create a set of requirements for various possible factory upgrades, accordingly with the product designs and technological processes selected for the product manufacturing. The PSC IDE 221 can create different product designs that are adapted to the factory and possible improvements. The designer can estimate cost and time for the factory improvements on the UI of the Designer UI 223 and factor in the cost and time for the factory improvements when selecting a product design. Once a design is verified and the tooling, technologies, and resources are available, a manufacturer can start production of the physical product.

In addition to creating Design Flows for manufacturing a single product, the PSC IDE 221 can also add new products to the production line which can be produced in parallel manufacturing to the original product. This allows to better utilize the potential of the factory, loading the equipment with operations for several products creation in parallel. Because the PSC IDE 221 knows the schedules and operating requirements for the factory tooling, the PSC IDE 221 can determine a process for additional part productions that utilize available factory tooling. If the available tooling cannot product multiple products simultaneously, the PSC IDE 221 can create schedules for alternating the production of the different products. Alternatively, the PSC IDE 221 can recommend factory improvements which can add additional machinery to a factory so that multiple products can be constructed by the factory.

Under some situations, the production requirements for a product may exceed the abilities of a factory or for distribution purposes, it may be necessary or more efficient to move product production to another factory. In these situations, the PSC IDE 221 can adapt the existing product fabrication processes at an original factory for production of the product at another second factory. If the tooling at the second factory is substantially the same as the original factory, the PSC IDE 221 simply apply the same tooling control instructions to the second factory tooling. However, if the same tooling is not available at the second factory, the PSC IDE 221 can revise the tooling control instructions based upon the tooling that is available at the second factory. The PSC IDE 221 can also recommend tooling improvements which can add additional machinery to the second factory so that the product can be manufactured at the second factory. In other embodiments, components for the product might be manufactured by a third party or implemented by another instance of the considered toolset on another manufacturing factory. The CAD model design 203 of the assembly, which is correct from technical point of view, and might be fabricated from a metal material at a factory at another geographical location using the robot tool control codes produced by the PSC IDE 221.

Design Flow methodology. The inventive system provides robotic manufacturing feasibility verification for a designer's design of an assembled product. Creation and verification of the scenario for the object product assembling and creation can include: verification and creation of the new technologies if required for product manufacturing, verification to determine if the available tools and machinery are satisfactory in capabilities for the manufacturing each required component and assembly of the product, and identification of the tools and machinery needed for product fabrication if required by technology. The inventive Designer UI can perform optimization based upon predefined criteria such as: cost per unit, weight, speed of production, resources used, etc. for the manufacturing process while the design is implemented. The Designer UI of the present inventive system can process the product design and design requirements and transmit product production options to a user interface of a design computer. In an example, the user interface can display a first product configuration and a second product configuration which can be different in product design with different parts and/or different fabrication processing by robotic machinery in a factory.

By displaying a plurality of optimized product configurations on a UI of the Designer UI 223, the designer can then directly compare tradeoffs on design solutions and technologies which can be provided basing on known/set criteria estimations. With this additional information, the designer can select a product design configuration. Once a product configuration has been selected, the inventive system can run a simulation on a Simulator 251 of the product fabrication on a virtual factory. The Designer UI 223 can create virtual assembling scenarios in virtual environments. If the simulation is successful, the virtual product will be fabricated as a final check before the real product is fabricated in a real factory that matches the simulated virtual environment.

The machinery, tools, methods and actors used for fabricating the products can be described with the terms "Ability" and "Tooling." Ability is the analogue of some product manufacturing operation performed by machinery equipment or human and Constructive Function (CF) describes the Ability. Tooling and Constructive System (CS) could be the robotic equipment used for product production and the capabilities of the tooling is described as the tooling's Abilities. As an example, an automatic guided vehicle (AGV) robot can have numerous functional abilities as listed in Table 1.

TABLE 1

| AGV ABILITIES | |
| --- | --- |
| 1 | Moving the cargo from one location to another location |
| 2 | Powering other equipment using AGV's internal electrical battery via connecting to the AGV power outlet. |
| 3 | Planning the route to/from loading/unloading area which can require obtaining localization and parking the AGV in the exact loading/unloading position |

A robot manipulator can have a completely different set of abilities than the AGV robot such as listed in Table 2.

TABLE 2

| MANIPULATOR ABILITIES | |
| --- | --- |
| 1 | Grasping an object by the manipulator |
| 2 | Operating with objects of particular shape and dimensions |
| 3 | Moving the manipulator along a predetermined or calculated trajectory |
| 4 | Moving the manipulator with a controlled force together with the grasped object, etc. |

A few other examples of tooling can include: grippers, glue mixers, glue applicators, lifting devices, cameras, etc. In addition to the tooling having the particular set of abilities, tools might also have a set of high level operations which can be a specific sequence of a plurality of the tool abilities. The abilities of the robots, robot controllers, robot control software and applications can be defined in data structures stored in a tool database in the technologies knowledge base 243.

Constrictive System and Constructive Function might be compound entities, depending on the level of abstraction, where the particular instances are applied. Functions and objects might be considered automatic at certain levels. For example, on the level of consideration of Automated Guided Vehicle, the CS it needs are: camera, gripper, sensor, charger.

AGV only requires particular abilities from these subsystems: vision, handling, power supply. On AGV layer one does not care of the insides and compounds of these tooling. From the factory logistics level standpoint AGV is the system, which provides requested abilities; atomic; with no details of the implementation.

Figure 4:
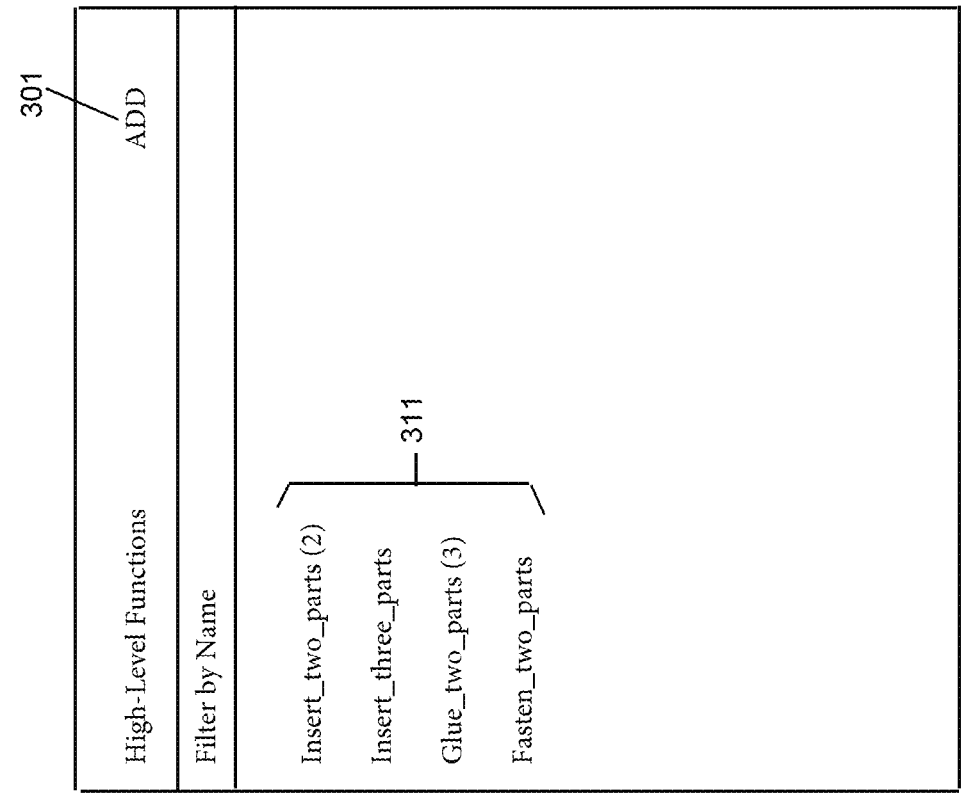
FIG. 4 illustrates a user interface listing robot high-level functions.
Figure 3:
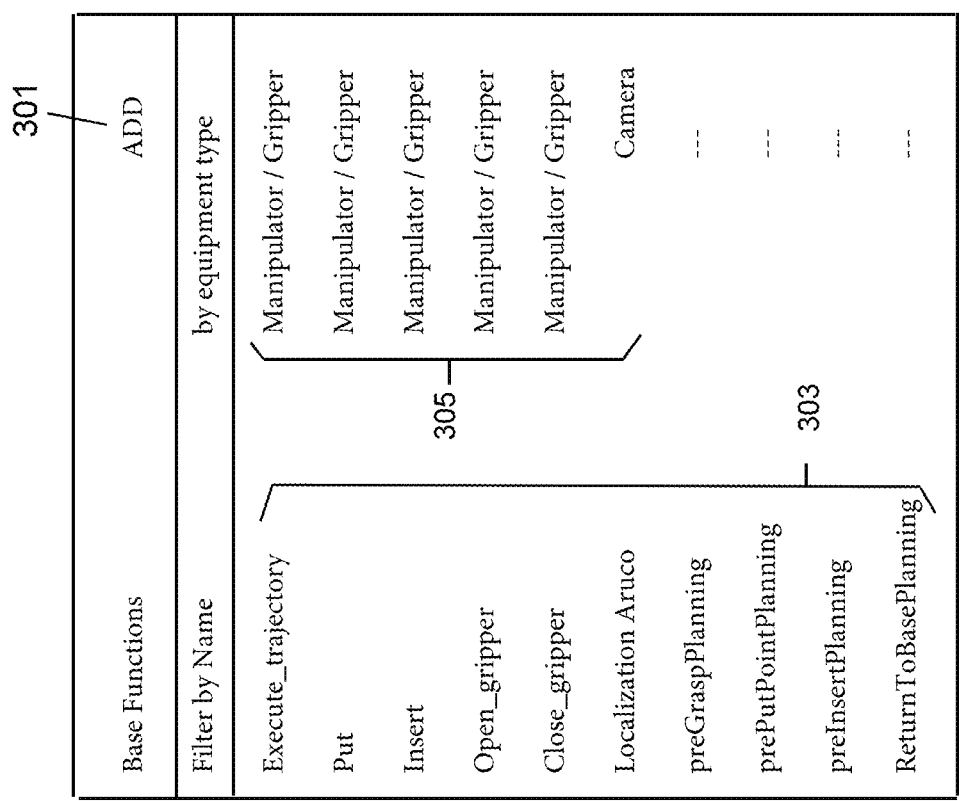
FIG. 3 illustrates a user interface listing robot base functions.

With reference to FIG. 3 an embodiment of a UI on the Designer UI displaying base functions 303 for different equipment type tools 305. In this example, the UI has an input for applying a filter displaying the desired tool functions. The filtered base functions are listed in a left column and the corresponding tools are listed on the right column. The UI can also include an "ADD" button 301 which can be clicked to add base functions when new tools are added to a factory environment. With reference to FIG. 4 an embodiment of a user interface displaying High-Level Functions can be displayed. These high level functions can each be a specific sequence of base functions which can perform more complex functions. For example, single tool control solutions might include a number of projects and the assembly of libraries/modules which are compiled into a single executable CS. By clicking on any of the listed functions 311, the code corresponding to the selected functions are displayed. With reference to FIG. 5, the UI displays the code for the base functions: 1. Execute trajectory, 2. Put and 3. Insert. The UI specifies that the required tooling for these functions is a manipulator or a gripper.

The Constructive Functions Development IDE can assist the designer in creating code for tool functionality by providing code for the desired tasks to the designer. With reference to FIG. 6, an example of code for a robotic pick function created in the CFD IDE is illustrated. The designer can specify that gripper tool will be used and the requirements for the task to be performed such as pick location and movement requirements such as trajectory, vector, etc. The UI can respond by displaying the necessary tool control code that provides instructions used by a gripper to move in a specific trajectory through pick waypoints to a specific location. This code can first be tested by the Simulator and then used by the gripper used during product fabrication.

Figure 7:
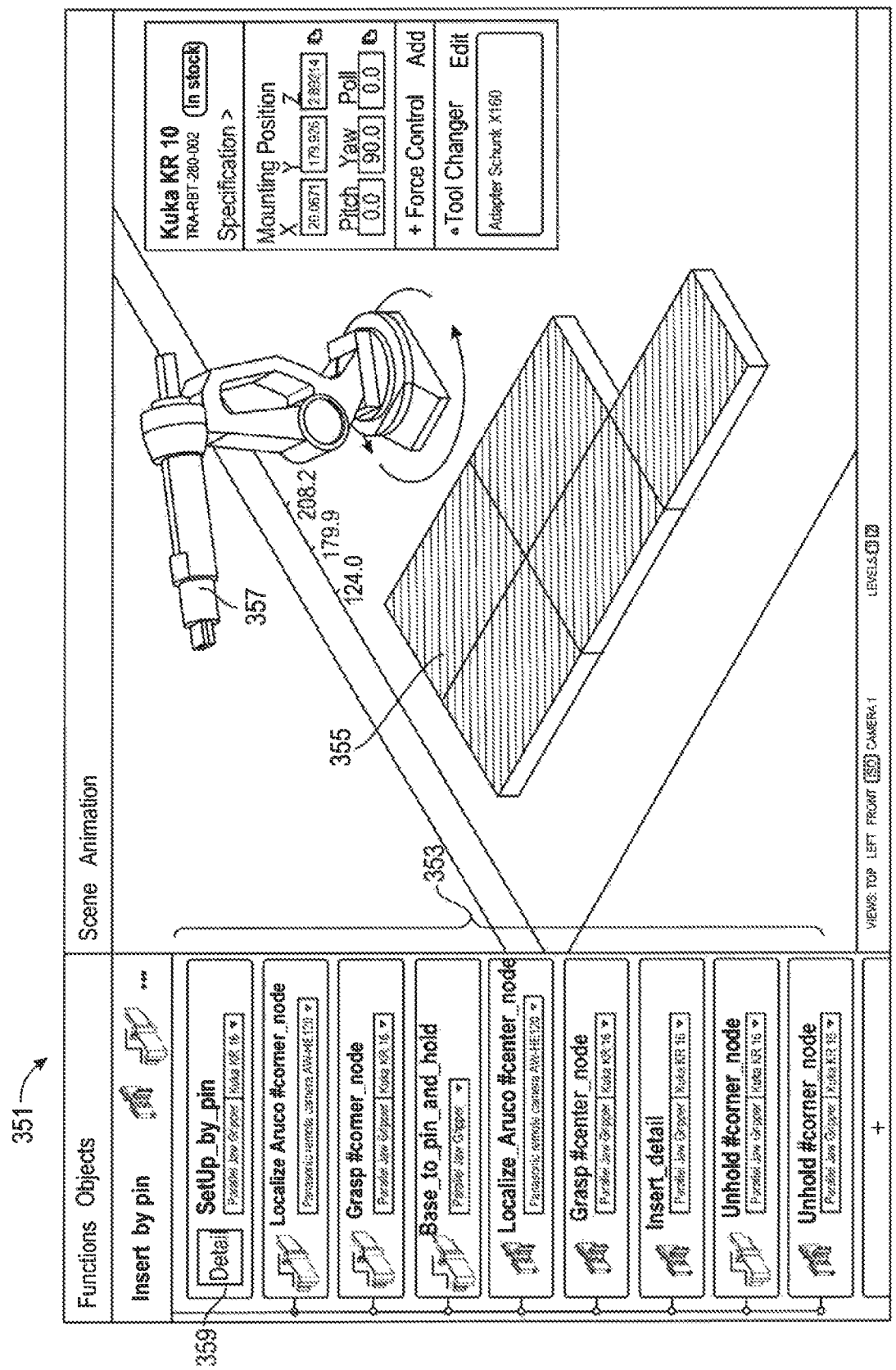
FIG. 7 illustrates a user interface with a robot animation and failure report.

With reference to FIG. 2, the design tool 223 can communicate with a Constructive System Studio 231 can also include a Scene Configurator tool 235 which can provide a virtual graphical representation of virtual tools performing a sequence of selected functions on a user interface of the designer computer. FIG. 7 illustrates an embodiment of a UI 351 which shows how the unsolved CS scenario is displayed at the designer tool. On a left portion of the UI there are a sequence of tool function steps 353 which are considered and a corresponding virtual tool 357 in an assembling scenario 355 is on a right portion of the UI 351. The virtual tool 357 can move in accordance with the tool function steps 353. In this example, the topmost functional step 359 did not pass the verification processing by the SC tool 235. In this example robotic manipulator is colored red on the illustrated robotic scene. The Scene Configurator tool 235 provides failure report informing the designer that the tool does not have the ability to perform the current function, because the wrong gripper is attached as shown in the virtual tool 357 animation. The designer can correct the error by changing the tool so that a gripper that is compatible with the specified function. The correction can be applied to the topmost functional step 359 and the process can be simulated again by the virtual tool 357.

The Product Solution Constructor (PSC) 221 is an IDE, which helps the designer to make decisions, based on the knowledge of capabilities of the manufacturing technologies stored in the knowledge base 243 in real-time. The solution in the PSC 221 IDE might contain the design of the part or full assembly of the compound product as an automobile axe, roof, body, or whole vehicle. The PSC 221 outputs the infrastructure-executable algorithm that describes each step of the scenario of the product manufacturing/assembly. The knowledge base 243 may only store the proprietary information for the existing Constructive Systems (CS) which can be owned by a common corporate entity. Alternatively, the knowledge base 243 may be a shared database of information which may be open source and not proprietary.

In some embodiments, the inventive system may not have a CS that satisfies the product's manufacturing needs. In this situation, the PSC 221 issues request for the CS creation so the CSS 231. The CSS 231 can then create a record to initiate the creation using the Constructive Functions Development IDE 233, Scene Configurator IDE 235 and Feasibility Checker 237. Alternatively, the CS can be imported by the PSC 211 from third-party CS providers.

The general manufacturing scenario can be a product building plan produced by the PSC IDE 221. The product building plan could be any sequence of the tool functions, which lead to product creation, assembly, or service. A simple example of a portion of the building plan for a two wheeled chassis assembly is a sequence of Constructive Functions:
1. AGV1 goes to wheels storage
2. loader loads two wheels on AGV1
3. AGV1 delivers wheels to the robotic cell
4. AGV2 delivers the axle to the robotic cell
5. robot bolts the wheels to the axle
6. complete assembly is loaded on AGV2
7. AGV2 delivers assembly to the storage
8. assembly is unloaded from AGV2 and placed on the rack More complex assemblies will require more complex and elaborate building plans. With reference to FIG. 8, an example of a central console assembly specification is illustrated which includes a sequence of CSs for the tools and functions: bolding, gluing, manipulating, mounting, etc.

The Designer UI is used by the designer to create 3D visual concept models of the product. The Designer UI 223 allows to segregate product designs into subassemblies and parts. The designer defines the integration and assembling points and surfaces on the component parts to set geometrical connections between Constraints (Siemens NX terminology) or Mates (Solidworks) which can be limitations or requirements of the product components and mates which are connection points in the CAD tools.

The metainformation for the parts can describe the joining surfaces of the modules which is set in CAD tool by the designer and used to work with the whole assembly in 3D tools. In the inventive system, the use of metainformation is extended to be used with the tools of the proposed Design Flow to define the joint options and operations, applicable from the manufacturing process. Mates define the geometric connection of parts, which is used in the following to perform the robotic operations. The mates/constrains for pieces define the technological process and robotic operations. Previous meaning of the mate: attach the surfaces, is now: perform the operation to join (glue, bolt, weld).

Figure 9:
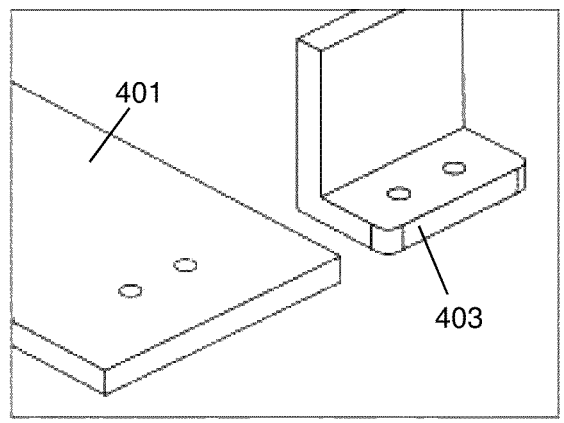
FIGS. 9-19 illustrate a user interface illustrating virtual parts and alignment features of the virtual parts.
Figure 10:
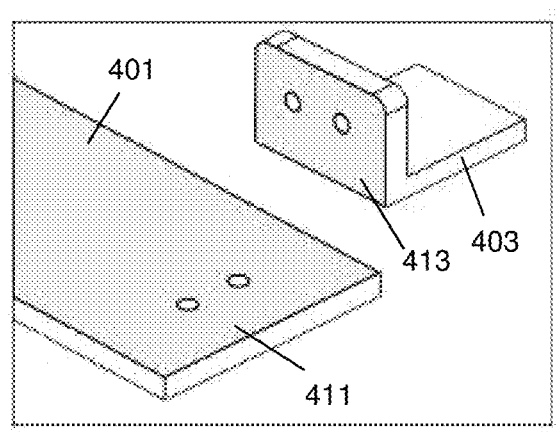

With reference to FIG. 9 a simple assembly includes a first planar part 401 and a second "L" shaped part 403. The designer can manipulate the parts and with reference to FIG. 10, the designer has created a touch constrain with a first joining surface 411 on the first part 401 and a second joining surface 413 on the second part 403 are highlighted. The joining surface 411 can be defined by the designer as a planar Surface 1: [<polygon 1>, <polygon 2>, . . . ] and the second joining surface 413 can be defined by the designer as planar Surface 2: [<polygon 1>, <polygon 2>, . . . ].

Figure 11:
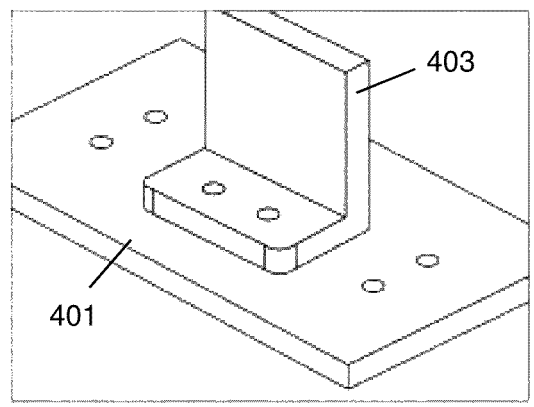
Figure 12:
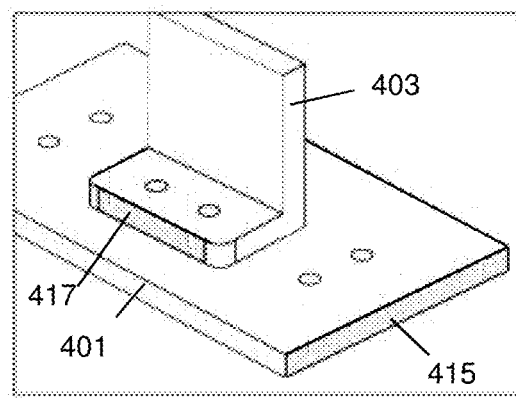
Figure 13:
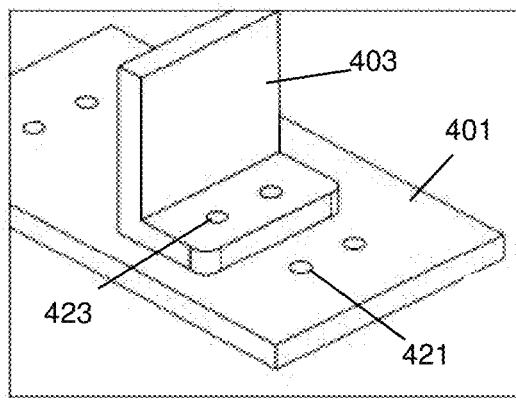
Figure 14:
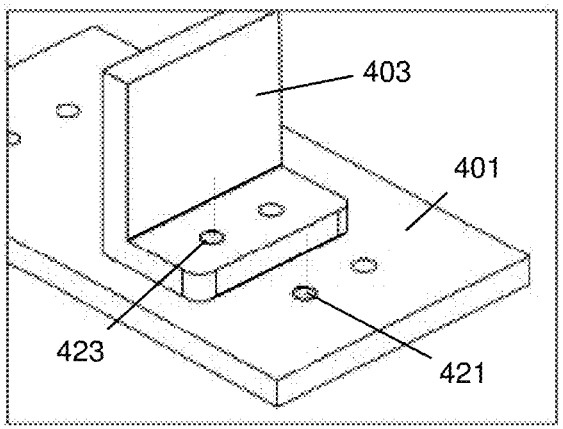
Figure 15:
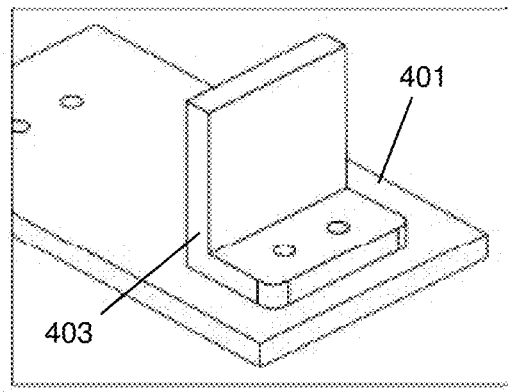

Once Touch Constraints are defined in the coordinates of the scene (in the editor) the parts will be joined using the Designer UI. With reference to FIG. 11, the system can attempt to comply with the joining instructions. However, in this example, the UI shows that the first part 401 and the second part 403 are misaligned because the position of the second part 403 is incorrect. In order to properly orient the parts, the designer selects two surfaces by which Parallel Constraint is created. With reference to FIG. 12, the user has selected a first parallel surface 415 on the first part 401 and a second parallel surface 417 on the second part 403. With reference to FIG. 13, the Designer UI can cause the first parallel surface 415 and the second parallel surface 417 to be aligned in parallel. However, the first part 401 can have a first bolt hole 421 and the second part 403 can have a second bolt hole 423 which are out of alignment. With reference to FIG. 14, the designer can then input a concentric constrain for the first bolt hole 421 and the second bolt hole 423. In this example, the designer can specify an insert vector of (0, 0, 1) which indicates a pure vertical bolt insertion orientation and a mate point (X, Y, Z) to create a Concentric Constraint, which is based on two vectors, orthogonal to these surfaces as defined and set by the designer. With reference to FIG. 15, after applying the described constrains, the first part 401 and the second part 403 are properly positioned and joined in the correct orientation.

With the first part 401 and the second part 403 in alignment, the Designer UI can be used to provide instructions for permanently joining the first part 401 to the second part 403. There are various possible joining mechanisms such as: adhesives, glue, welding, clamps, bolts, etc. If the designer decides to use glue, the designer can select the coupling mechanism tool and apply the adhesive to the two contacted surfaces which can be performed by a glue tool performing a gluing function.

Figure 16:
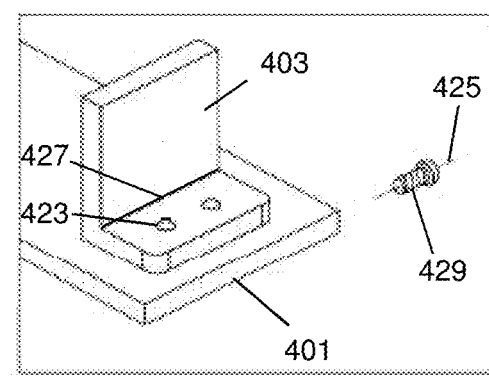
Figure 17:
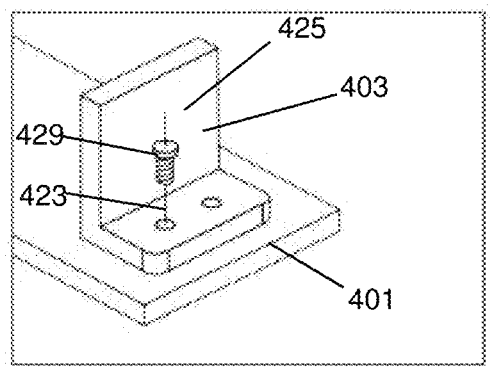

In this example, the designer may choose to insert a bolt into the hole between the parts using a bolt tool performing a Bolting function. With reference to FIG. 16, the designer has defined two vectors for the axial guides, a first vector 425 for the bolt and a second vector 427 for the hole. With reference to FIG. 17, with Designer UI he has aligned the direction and orientation of the bolting with the first vector 425 for the bolt aligned with the second vector 427 for the hole 423. The insert vector can be (0, 0, 1). At this point Align/Lock Constraint is defined.

Figure 18:
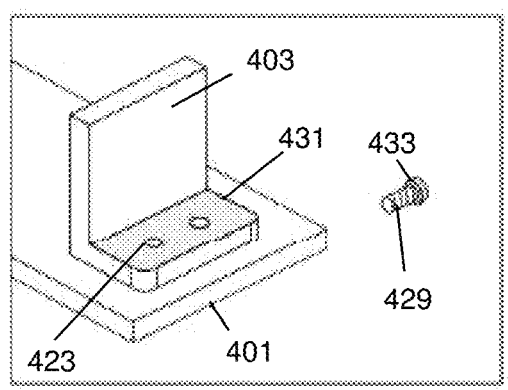
Figure 19:
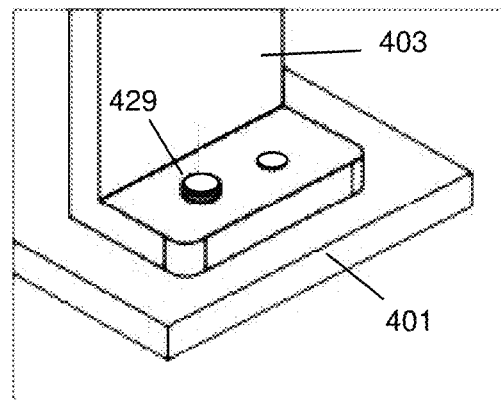

With reference to FIG. 18, the designer can define Touch Constraints for the insertion of the bolt 429 into the hole 423 so the system knows how far to screw the bolt 419 into the hole 423. In this example, the design can select an upper surface 431 of the second part 403 that is adjacent to the hole 423 and a lower surface 433 on a bottom surface of the cap of the bolt 429. With reference to FIG. 19, a virtual bolt screwing tool can screw the bolt 429 into the hole 423 until the lower surface 433 of the cap is against the upper surface 431 of the second part 403. This can complete the example portion of the assembly construction and result in geometry and constraints/mates information that are defined in CAD and stored in a product design database. This described process can be applied to all additional parts and assemblies until all of the parts and tasks needed to create the product are input.

The Designer UI can be used to display all available product fabrication options. The available options can depend upon the product fabrication requirements. For example the fastening of two parts can require a joining process which can have the options: bolting, gluing, welding, and other methods which are provided to the designer. This option information can be illustrated in a user interface of the designer tool. FIGS. 20-26 illustrate other examples of a UI of the Designer UI which include product production options.

Figure 20:
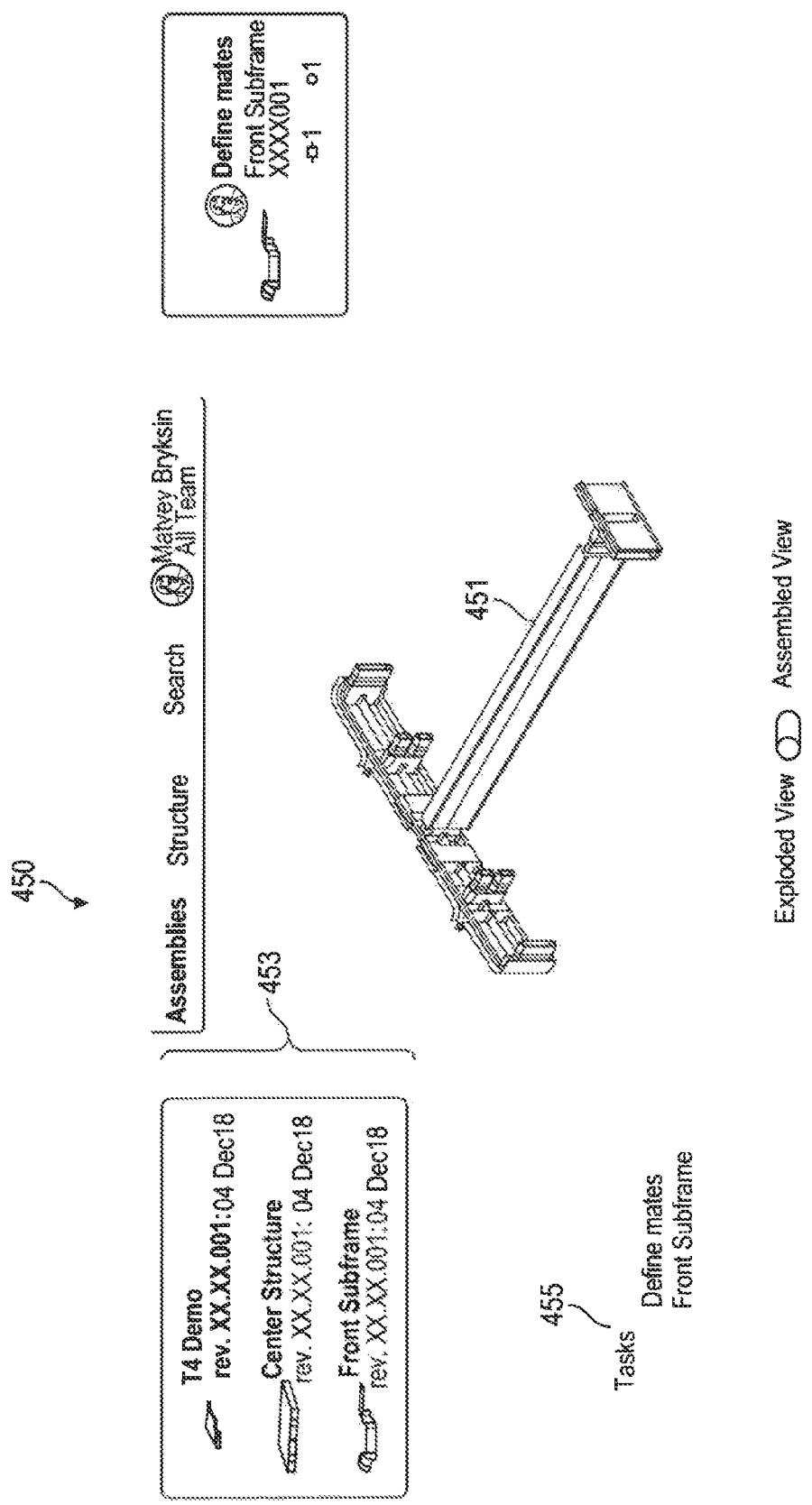
FIGS. 20-25 illustrate a user interface of the designer tool.

With reference to FIG. 20, the UI includes a right portion which shows a 3D virtual model of an assembly 451. The upper left portion of the UI includes descriptions of the assembly components 453 which can include pictures of the components, names of the component, revision numbers and revision dates of the components. The lower left portion of the UI can illustrate the tasks 455 that are being shown in the virtual model of the assembly 451. In this example, the task 455 can be "Define mates" which are the portions of the assembly that other components will be attached.

Figure 21:
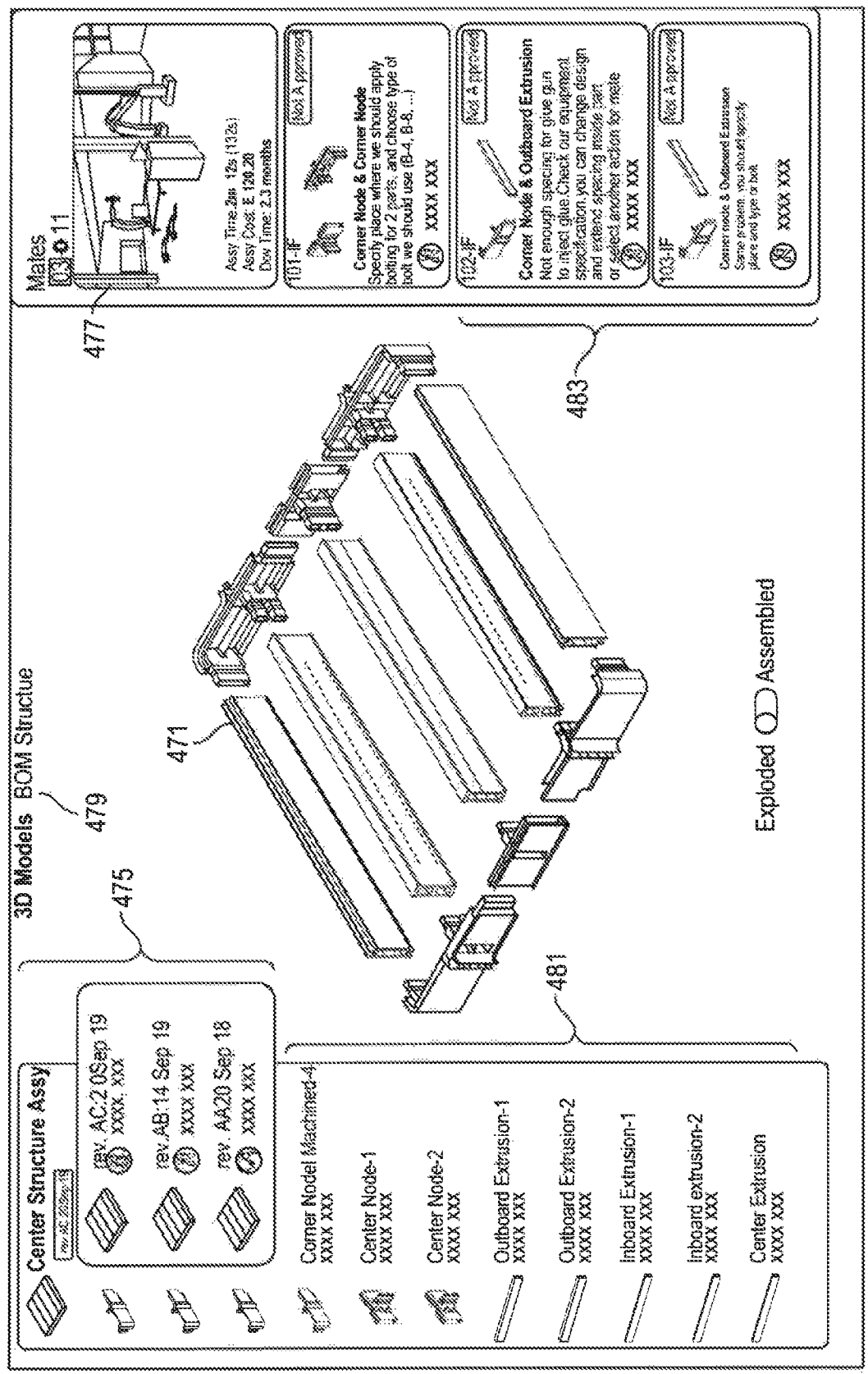

FIG. 21 illustrates a UI showing a 3D design of a frame assembly 471 in an exploded view with a listing of construction options 475 and a virtual simulation 477. The UI can have a control 479 which can alter the display of the assembly between exploded and assembled views. The left portion of the UI includes a listing of components 481 in the assembly. The upper right portion of the UI is a virtual representation of the selected robotic processing 477. In this example, the virtual robot tooling 477 includes the assembly time model of 2 minutes and 12 seconds, the assembly cost of 120.20 GBP and an estimated development time of 2 to 3 months. The errors in the currently selected robotic processing 483 are listed on the right side of the UI. The errors are identified by the part names and descriptions of the errors. In this example, a first error note states that the place and type of bolt used to connect the center node and the corner node needs to be specified. A second and third error notes both state that there is not enough space for a glue gun to inject glue between the corner node and outboard extrusion.

Figure 22:
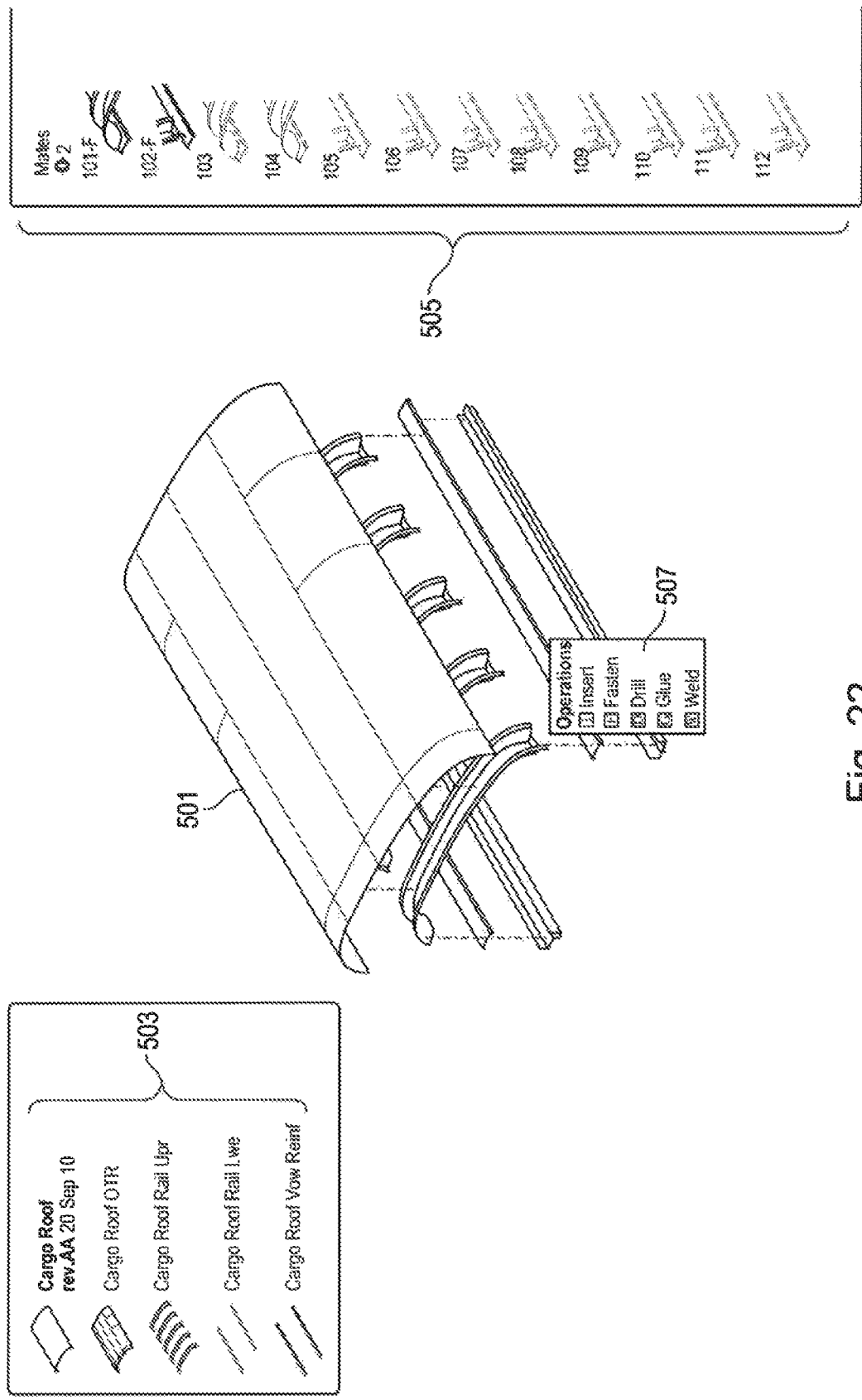

With reference to FIG. 22, another embodiment of a UI is illustrated with 3D model of an exploded view of a bus roof assembly 501. The left side illustrates a listing of assembly components 503 and the right side lists a plurality of connection point mates 505 for the cargo roof assembly 501. The UI can have a cursor which can allow a designer to click on the individual locations of the cargo roof assembly and the UI can display the operations 507 associated with the selected location. In this example, the operations are listed as Insert and Fasten.

Figure 23:
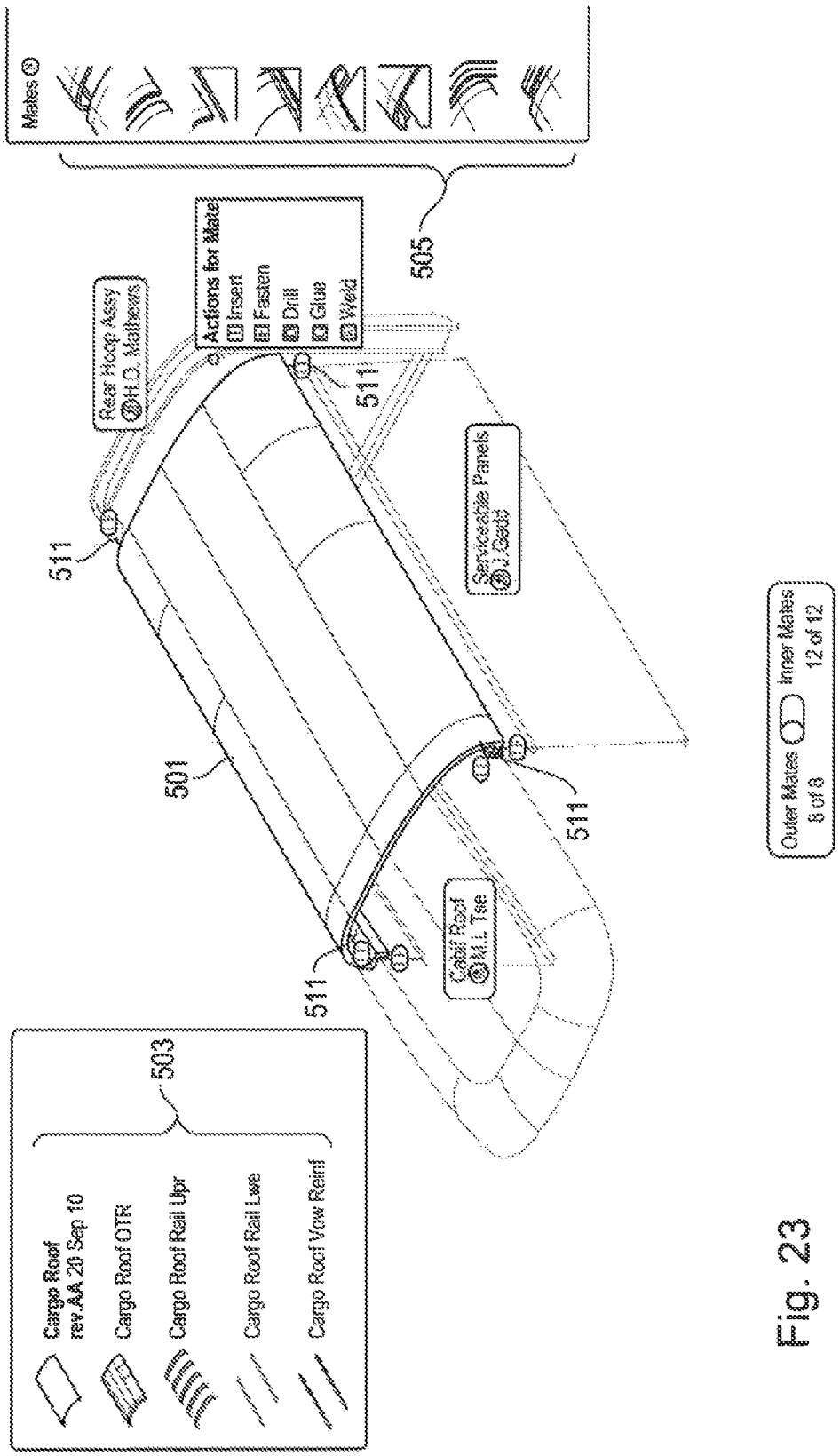

With reference to FIG. 23, another view of the UI is illustrated showing an assembled view of a bus roof assembly 501 with the connection point "Mates" 511 highlighted. The 3D representation illustrates 8 outer mates and details of the 8 mates are listed on the right side. The UI can have a control to switch the 3D representation of the cargo roof between 12 inner mates and 8 outer mates. The left side of the UI illustrates cargo roof components.

Figure 24:
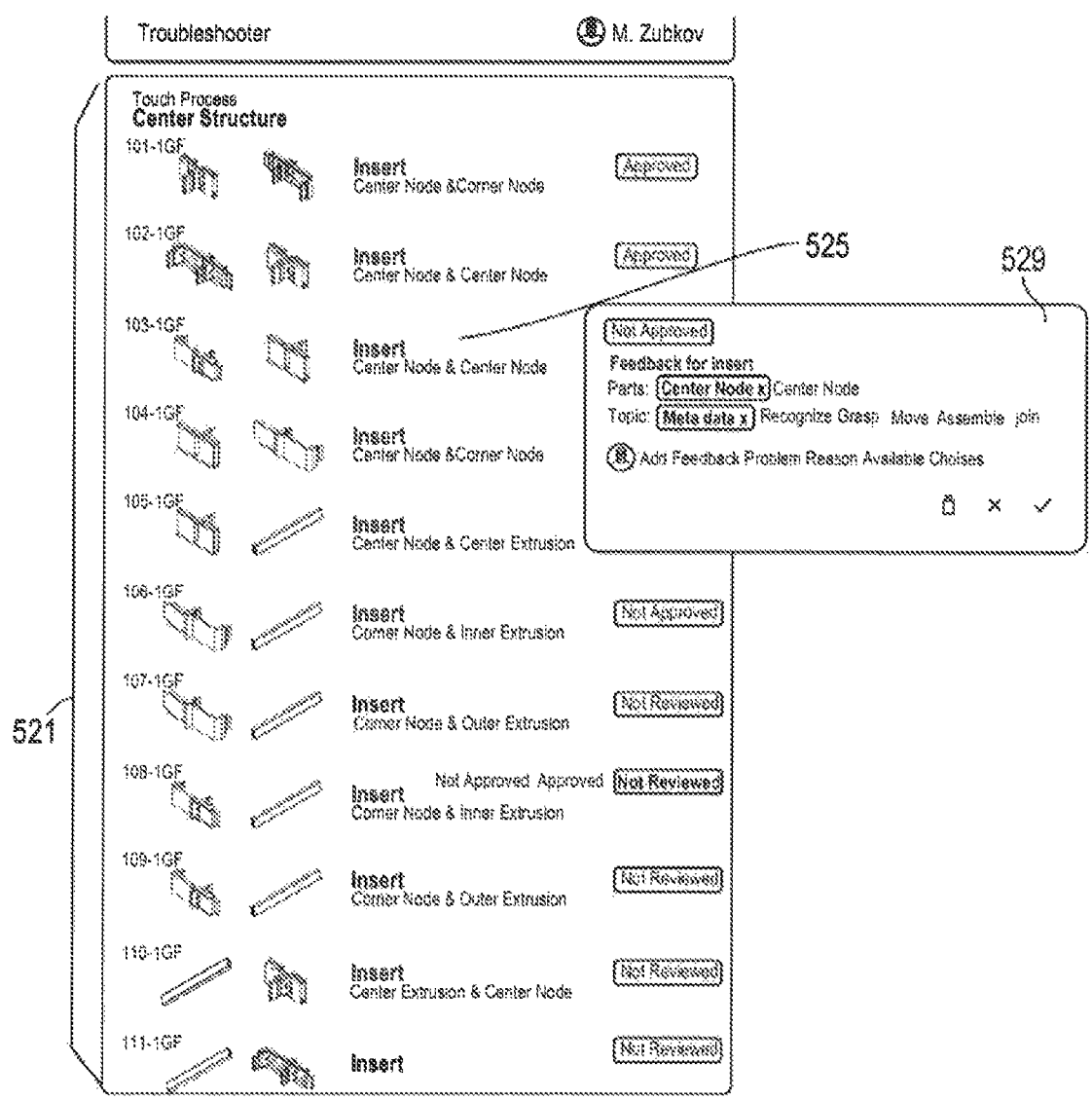

In an embodiment, the options include: design change variants and/or new tooling/ability (CF/CS) creation requests In case of success, the Debug Assistant tool authorizes for simulation of the assembly process. FIG. 24 illustrates a UI design verification failure report from the Debug Assistant. In this example, the left side of the UI lists a sequence of process steps 521. The first two insert steps 521 have been approved. However, the third process step 525 was not approved. The user has clicked on the third process step 525 which results in the Designer UI displaying a failure report 529 which indicates that there is an error with the center node metadata.

Figure 25:
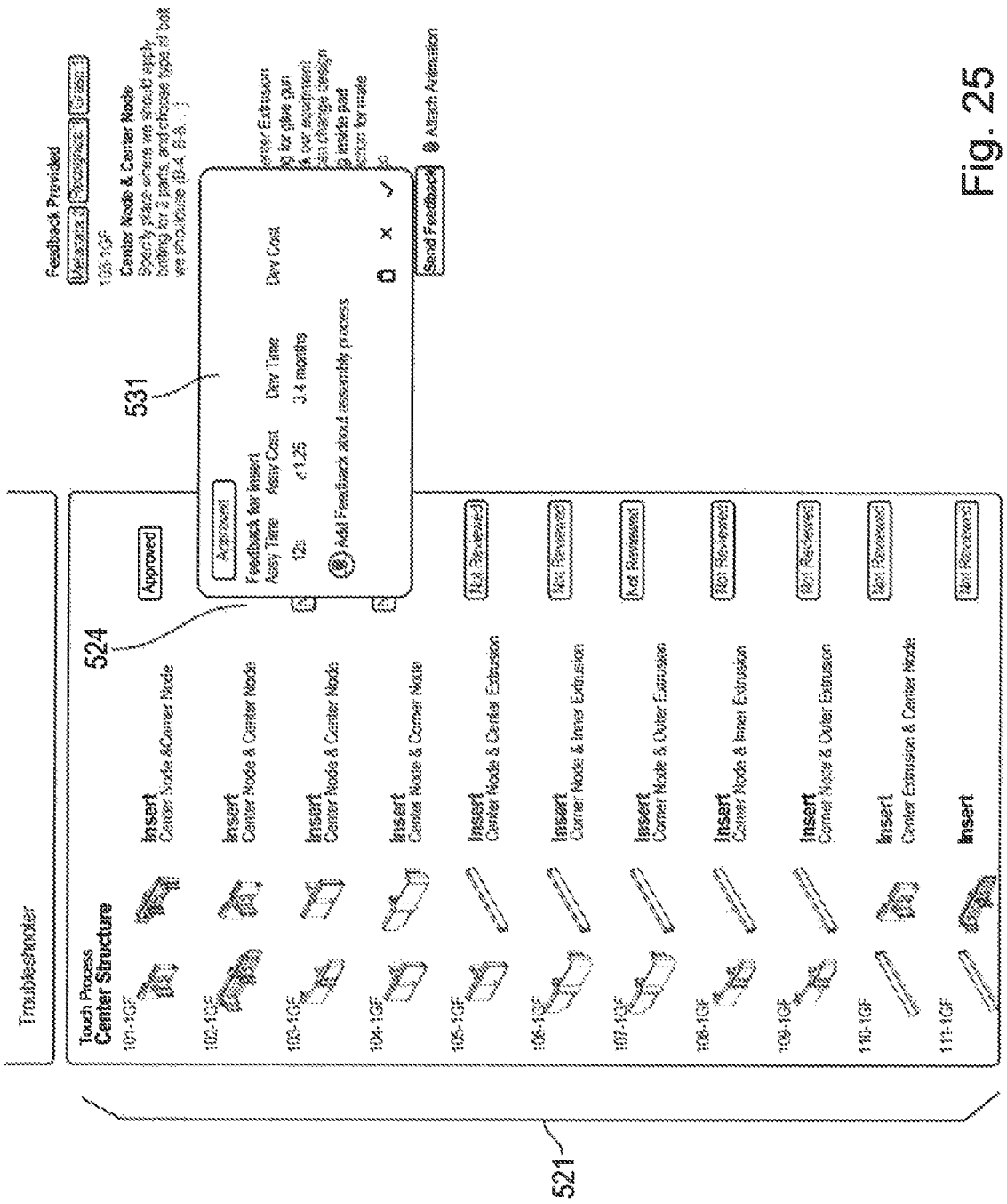

FIG. 25 illustrates a UI with the user clicking on the second processing step 524 which has been approved. The Designer UI displays a feedback report 531 with the KPIs for the second step 524. In this example, the displayed KPIs include the assembly time 12 seconds, assembly cost 1.25 GBP and development time 3-4 months.

Some tasks from the design approval workflow can initiate other tasks. For example, task in the backlog for new technology or constructive system creation might be created. The simulation task is automatically generated once the design is verified by static tools. The automatization of any manufacturing is the sequential process, which might be applied to the existing business processes of the factory step by step. Once the decision-making module is mature enough, it might substitute human expert. Eventually, the design and manufacturing might be driven by initial KPI/SLA set by the high-level management and designer, who's work will be completely verified and approved by software system.

Factory Configurator Toolset 261 (FIG. 2) solves the task of configuring a new robotic factory according to the product design and technology requirements. The inputs for the toolset are defined by optimization criteria and limitations, SLAs, KPIs. The output of the toolset is the full factory description from the manufacturing standpoint: workshop space/layout, routes, robots, internal logistics, power, tooling and materials provisioning requirements. The output also includes process of the manufacturing description in some format.

Eventually, the design of the product and the production quantitative measurements provide a complete description of the manufacturing processes. The factory content and dependencies are described by Factory Configurator 261. This description might be used for building a new factory, transferring the factory, transferring the manufacturing to another existing factory, or to form the factory update plan.

Resource availability (human, robot, materials etc.) do impact the technological manufacturing process, the factory configuration for different geographical locations will be different. The same product will be produced differently in Europe, India and China. The Factory Configurator tool allows designers and decision makers to plan, support and optimize the product production in each location according to the factory tooling. In some cases, the robotic operations like, for example, delivery or dimensions check might be substituted by human operators (or controlled by human), the task of Factory Configurator is to analyze and propose possible options.

The proposed methodology addresses different problems, depending on the customer use-case: 1. configure/upgrade the factory driven by product design (design is stable and constant); 2. change design to available factory abilities (factory is constant); 3. variable design, variable factory; 4. plan and create a new factory, depending on existing design. The output here is the full factory specification. The design might be flexible.

The inventive system can provide flexible robot control system which is used to control the robots in a factory. The control system can store information for the robots and robot functionality which can be stored in the memory of the system and used when the factory needs to be modified or reconfigured to fabricate modified or new products. The inventive system is flexible so that additional robots are added to the system and the controls for these new robots can be added to the system. For example, external technologies can be applied to the inventive system of the manufacturing Design Flow. This flexibility can be very useful because the product design change can occur at any time. These design change requests might arrive from any subsystem or any dependency. The KPI setting and change requests might be initiated by some business process handling software, or by the manufacturing needs.

In addition, the inventive system can be used to create robot controls for other and/or different robots in different product factories. The system can have specific design information for the fabrication of a product. The system can apply the product information to the robots in a different factory. In some cases, the different factory may have robots which can perform the same fabrication processes as the original factory but the arrangement and locations of the robots can be different in the new factory. The same robot controls can be applied with only the transportation of the product components can be modified for the new factory. In other embodiments, the different factory can have different robots which have different abilities than the robots in the original factory. In these embodiments, the robot controls for the product fabrication processes will need to be recreated so the tooling at the different factory will be able to produce the product.

The present invention provides various advantages over of the existing solutions. The inventive system provides a flexible automatization process for the whole Design Flow to product production. The inventive system is more flexible and not customized or tuned for existing solutions for a particular industry and factory. The inventive system uses technological processes and designs that are easily transferred to the different environment and verified for applicability without building the whole targeted infrastructure. The time from design to the manufacturing start takes much less than several years for complex objects like vehicles. There inventive system simplifies the procedures of verification and approval and requires fewer people with fewer different types of expertise and authority.

The present invention addresses time to market via maximal automation; weighted decision making via provisioning of the relative information previously unavailable to designer. The present invention minimizes the high capital expenses by avoiding product specific infrastructure.

The present invention comprises different aspects of a flexible manufacturing process which enables flexibility in the initial product design, technology process and manufacturing. The inventive system can function at real-rime, when the process of the product assembly design occurs. In particular, the invention is targeted to automatization of the Design Flow: verification, testing and finally planning of robotic, software or human operations.

The inventive system can also provide feedback to designers so that the designers can immediately determine if selected processes and changes are suitable or optimized for real production. For example, the designer can draw a part or assembly and immediately understands how these components can be produced, how much the component will cost and what properties the component will have based upon feedback from the PSC IDE 221. In some embodiments the designer even might not be aware of the technological sequences, the details might be hidden by access layers since this information may not be required to make an optimized product production decision which may in some cases be unnecessary for the designer's work. The PSC IDE 221 can provide the designer with some options of manufacturing with estimated costs, delivery time, and other information for each of the options. The option to select the "new technology development request" might be provided to the designer. Because the design has various types of information when making a product design decision, the new technology applied to a product might add some time and cost to a product development manufacturing start. However, this added new technology might be strategically beneficial to the company. The inventive innovation can improve the methodology for creating a product from drawing it in CAD tools to assembly of the product in hardware. The inventive solution can reduce the previously known sequence from design to production and minimizes the number of roles and dependencies. Thereby, the inventive system can reduce both the time required to bring a product to market and the cost per product unit manufacturing.

Final verification of the project design is done in Simulator 251. Full set of players (objects, tools on scene) and sequences is reproduced in virtual environment to prove that the solution is configured properly or to find errors. The verification of the assembling scenario play is performed using targeted Simulator tool, based on 3D visualization engine (Unreal 3D engine).

Once a product design is finalized, the PSC IDE 221 can create a bill of materials which is a list of components, used for creation the designed product. This list contains prices, weights, and other information which is provided to the designer by proposed automated system. In additional report the cost of production/assembling is estimated. Total cost per product unit and speed of the production is reported to the designer, depending on the design specifics.

After the project design has passed simulation and the product production is approved, the robot instructions can be used by the robots in the factory to produce the real parts. The predicted robot processing times and costs from the simulation should match the actual times and costs for the real parts. If there are differences, corrections can be applied to the Simulator so that the predicted times and costs will be more accurate in the future.

Figure 26:
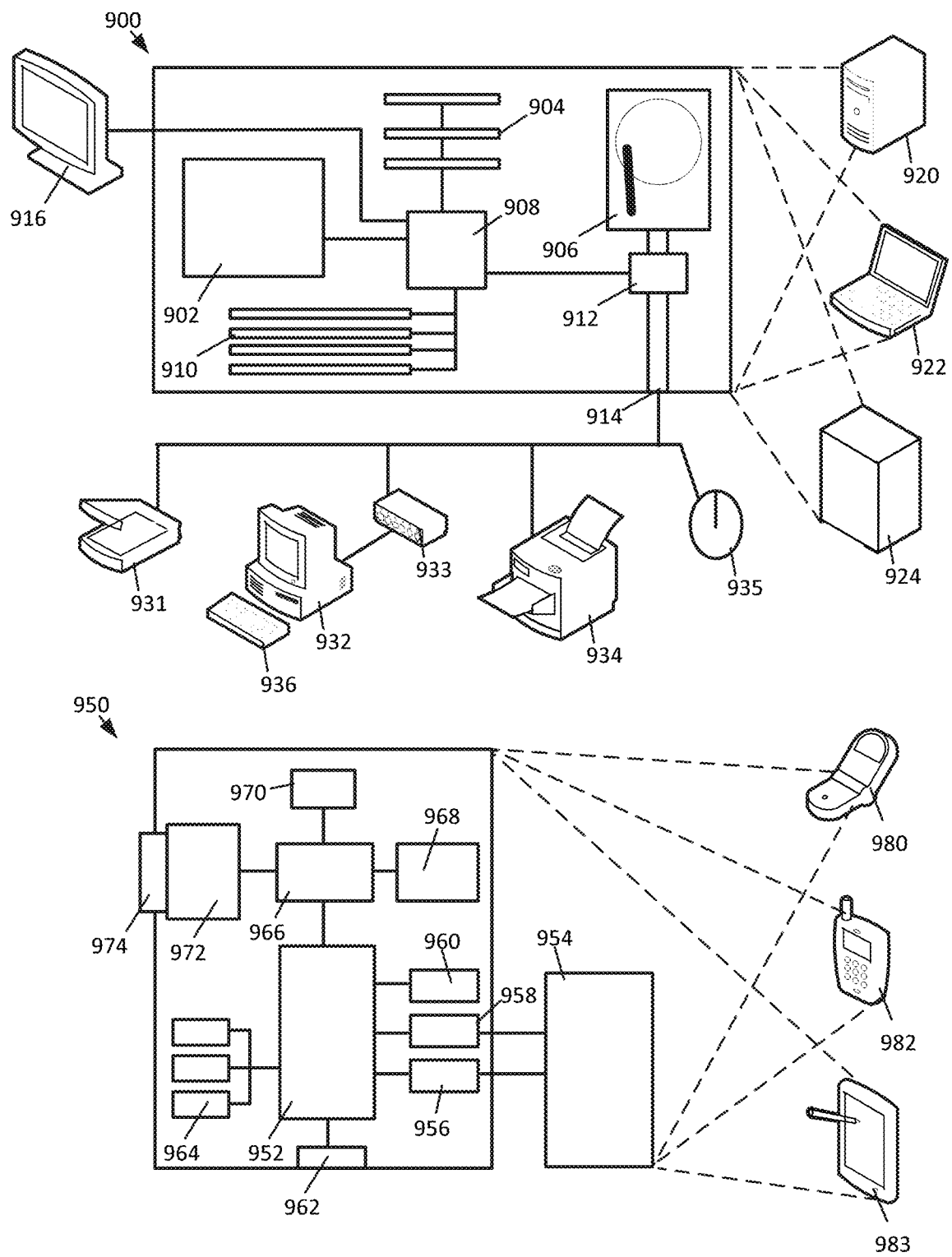
FIG. 26 illustrates an embodiment of a computer system.

FIG. 26 shows an example of a generic computer device 900 and a generic mobile computer device 950, which may be used to implement the processes described herein, including the mobile-side and server-side processes for installing a computer program from a mobile device to a computer. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components processor 902, memory 904, storage device 906, high-speed interface 908, high-speed expansion ports 910, and low speed interface 912 are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple busses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port 914, which may include various communication ports (e.g., USB, Bluetooth, Ethernet, wireless Ethernet), may be coupled to one or more input/output devices, such as a keyboard 936 in communication with a computer 932, a pointing device 935, a scanner 931, or a networking device 933 such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a Microdrive, solid state memory or other device, to provide additional storage. Each of the components computing device 950, processor 952, memory 964, display 954, communication interface 966, and transceiver 968 are interconnected using various busses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provided in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, memory on processor 952, or a propagated signal that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, Wi-Fi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smartphone 982, personal digital assistant, a tablet computer 983 or other similar mobile computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Example Clauses

1. A method for manufacturing a product comprising:
analyzing by a designer tool, a product design having parts and assemblies, and robot tooling having robot tooling abilities in a factory;
determining by the designer tool, a sequence of abilities using the robot tooling abilities for moving and assembling the parts and the assemblies to create the product that meets a set of product requirements;
determining by the designer tool, options for the robot tooling producing the product; displaying the sequence of the robot tooling abilities for producing the product, and the
options for the robot tooling abilities on a user interface of a design computer; selecting some of the options through the user interface of the design computer; creating control codes for producing the product from the sequence of abilities by the
robot tooling;
simulating the fabrication of a virtual product by virtual robot tooling with the control codes for the sequence of abilities and the options that were selected on a simulator; and
verifying by the simulator that the control codes for the sequence of abilities correctly manufactures the product.

2. The method of clause 1 further comprising:
determining by the designer tool, an alternate sequence of abilities using the robot tooling for producing the product that meets the product requirements;
displaying the alternate sequence of abilities on the user interface of the design computer; selecting the alternate sequence of abilities through the user interface;
creating alternate control codes for producing the product from the alternate sequence of abilities by the robot tooling;
simulating the alternate fabrication of the virtual product by virtual robot tooling with the alternate control codes for the alternate sequence of abilities and the options that were selected on the simulator; and
verifying by the simulator that the alternate control codes for the alternate sequence of abilities correctly manufactures the product.

3. The method of clause 2 further comprising:
determining processing times for each of the abilities in the sequence of abilities and each of the abilities in the alternate sequence of abilities, wherein the cumulative processing time of the abilities in the sequence of abilities is higher than the cumulative processing time of the abilities in the alternate sequence of abilities; and
displaying the processing times for each of the abilities in the sequence of abilities and each of the abilities in the alternate sequence of abilities on the user interface of the design computer; and
manufacturing the product with the robot tooling in the factory using the alternate control codes.

4. The method of clause 2 further comprising:
determining a weight of the product made using the sequence of abilities and an alternative weight of the product made using the alternative sequence of abilities, wherein the weight of the product made using the sequence of abilities is higher than the alternative weight of the product made using the alternative sequence of abilities; and
displaying the weight of the product and the alternative weight of the product on the user interface of the design computer; and
manufacturing the product with the robot tooling in the factory using the alternate control codes.

5. The method of clause 3 further comprising:
determining a cost of the product made using the sequence of abilities and an alternative cost of the product made using the alternative sequence of abilities, wherein the cost of the product made using the sequence of abilities is greater than the alternative cost of the product made using the alternative sequence of abilities; and
displaying the cost of the product and the alternative cost of the product on the user interface of the design computer; and
manufacturing the product with the robot tooling in the factory using the alternate control codes.

6. The method of clause 1 further comprising:
determining by the designer tool, an alternate sequence of abilities using alternate robot tooling in an alternate factory for producing the product that meets the product requirements;
displaying the alternate sequence of abilities on the user interface of the design computer;
selecting the alternate sequence of abilities through the user interface;
creating alternate control codes for producing the product from the alternate sequence of abilities by the alternate robot tooling;
simulating an alternate fabrication of the virtual product by virtual robot tooling with the alternate control codes for the alternate sequence of abilities; and
verifying by the simulator that the alternate control codes for performing the alternate sequence of abilities correctly manufactures the product using the alternate robot tooling in the alternate factory.

7. The method of clause 6 further comprising:
determining by the designer tool, a second alternate sequence of abilities using second alternate robot tooling in a second alternate factory for producing the product that meets the product requirements;
displaying the second alternate sequence of abilities on the user interface of the design computer;
selecting the second alternate sequence of abilities through the user interface; creating second alternate control codes for producing the product from the second
alternate sequence of abilities by the second alternate robot tooling;
simulating a second alternate fabrication of the virtual product by virtual robot tooling with the second alternate control codes for the second alternate sequence of abilities on the simulator; and verifying by the simulator that the second alternate sequence of abilities correctly manufactures the product using the second alternate robot tooling in the second alternate factory.

8. The method of clause 1 further comprising:

analyzing by a designer tool, a second product design and the robot tooling having robot tooling abilities;

determining by the designer tool, a second sequence of abilities using the robot tooling abilities for producing the second product that meets a second set of product requirements;

determining by the designer tool, second options for the robot tooling producing the second product;

displaying the second sequence of abilities, the robot tooling abilities for producing the second product, and the second options for the robot tooling on the user interface of the design computer;

selecting some of the second options through the user interface of the design computer; creating second control codes for producing the second product from the second sequence of abilities by the robot tooling;

simulating the fabrication of a second virtual product by the virtual robot tooling with the second control codes for the second sequence of abilities and the second options that were selected on the simulator; and verifying by the simulator that the second sequence of abilities correctly manufactures the second product; and manufacturing the second product with the robot tooling in the factory using the second control codes.

9. The method of clause 8 further comprising:

analyzing by a designer tool, a third product design and the abilities of the robot tooling in the factory;

determining by the designer tool, a third sequence of abilities using the robot tooling for producing the third product that meets a third set of product requirements;

determining by the designer tool, third options for the robot tooling producing the third product;

displaying the third sequence of abilities, the robot tooling abilities for producing the third product, and the third options for the robot tooling on the user interface of the design computer;

selecting some of the third options through the user interface of the design computer;

creating third control codes for producing the third product from the third sequence of abilities by the robot tooling;

simulating the fabrication of a third virtual product by the virtual robot tooling with the third control codes for the third sequence of abilities and the third options that were selected on the simulator; and verifying by the simulator that the third sequence of abilities correctly manufactures the third product; and manufacturing the third product with the robot tooling in the factory using the third control codes.

10. The method of clause 1 further comprising:

receiving modified product requirements for a modified product;

analyzing by the designer tool, a modified product design and the abilities of the robot tooling;

determining by the designer tool, a modified sequence of abilities using the robot tooling for producing the modified product that meets a set of modified product requirements;

determining by the designer tool, modified options for the robot tooling producing the modified product;

displaying the modified sequence of abilities, the robot tooling abilities for producing the modified product, and the modified options for the robot tooling on the user interface of a design computer;

selecting some of the modified options through the user interface of the design computer; creating modified control codes for producing the modified product from the modified sequence of abilities by the robot tooling;

simulating the fabrication of a modified virtual product by virtual robot tooling with the modified control codes for the modified sequence of abilities and the modified options that were selected on a Simulator; and verifying by the simulator that the control codes for the modified sequence of abilities correctly manufactures the modified product.

11. The method of clause 1 further comprising:

receiving second control codes for producing the second product from the second sequence of abilities by the robot tooling;

simulating the fabrication of a second virtual product by the virtual robot tooling with the second control codes for the second sequence of abilities and the second options that were selected on the simulator; and verifying by the simulator that the second control codes for the second sequence of abilities correctly manufactures the second product; and manufacturing the second product with the robot tooling in the factory using the second control codes.

12. The method of clause 1 further comprising:

receiving supplemental abilities for supplemental robot tooling in the factory;

creating by the designer tool, a modified sequence of abilities using the robot tooling and the supplemental robot tooling for producing the product that meets the set of product requirements;

creating modified control codes for producing the product from the modified sequence of abilities;

simulating the fabrication of the virtual product by virtual robot tooling with the modified control codes on the simulator;

verifying by the simulator that the modified control codes for the modified sequence of abilities correctly manufactures the product; and manufacturing the product with the robot tooling in the factory using the modified control codes.

13. The method of clause 1 further comprising:

receiving reduced abilities for the robot tooling in the factory;

creating by the designer tool, a modified sequence of abilities using the reduced abilities for the robot tooling and the supplemental robot tooling for producing the product that meets the set of product requirements;

creating modified control codes for producing the product from the modified sequence of abilities;

simulating the fabrication of the virtual product by virtual robot tooling with the modified control codes on the simulator;

verifying by the simulator that the modified control codes correctly manufactures the product; and manufacturing the product with the robot tooling in the factory using the modified control codes.

14. The method of clause 1 further comprising: exporting of the product manufacturing flow.

15. The method of clause 1 further comprising:
designing a factory configuration with a factory configurator based upon a sequence of abilities used to manufacture the product.
16. The method of clause 15 further comprising:
exporting of the factory configuration in pre-determined format.
17. The method of clause 1 further comprising:
storing robot tooling abilities in a technology knowledge database.
18. The method of clause 17 further comprising:
exporting of the robot tooling abilities stored in the technology knowledge database.

What is claimed is:

1. A method for robotic manufacturing a product, the method comprising:
analyzing, by a designer tool on a design computer, a product design of a product having parts and assemblies and a set of product requirements, the designer tool being coupled with a database storing information about robot tooling and robot tooling abilities that are available in a factory;
determining, by the designer tool, a sequence of robot tooling abilities from the available robot tooling abilities for moving, machining and assembling the parts and the assemblies to manufacture the product that meets the set of product requirements;
determining, by the designer tool, available tooling options for the robot tooling abilities that can be used to manufacture the product that meets the set of product requirements;
displaying on a user interface of the design computer the determined sequence of the robot tooling abilities for manufacturing the product and the available tooling options;
enabling a user to select some of the displayed options through the user interface of the design computer;
creating, by the designer tool, control codes for manufacturing the product by the robot tooling in the factory using the sequence of the robot tooling abilities and the selected options;
simulating, by a simulator on the design computer, a manufacture of the product by virtual robot tooling using the created control codes;
verifying, by the simulator, that the created control codes provide for correct manufacture of the product; and
manufacturing the product by the robot tooling in the factory using the created control codes.

2. The method of claim 1, the method further comprising:
determining, by the designer tool, an alternate sequence of robot tooling abilities from the available robot tooling abilities for manufacturing the product that meets the set of product requirements;
displaying on the user interface of the design computer the alternate sequence of the robot tooling abilities;
creating, by the designer tool, alternate control codes for manufacturing the product by the robot tooling in the factory using the alternate sequence of the robot tooling abilities and the selected options;
simulating, on the simulator, a manufacture of the product by virtual robot tooling using the alternate control codes; and
verifying, by the simulator, that the alternate control codes provide for correct manufacture of the product.

3. The method of claim 2 further comprising:
determining, by the designer tool, processing times for each of the robot tooling abilities in the determined sequence of the robot tooling abilities and the alternate sequence of the robot tooling abilities, wherein a cumulative processing time of the robot tooling abilities in the determined sequence of the robot tooling abilities is higher than a cumulative processing time of the robot tooling abilities in the alternate sequence of the robot tooling abilities;
displaying on the user interface of the design computer the determined processing times for each of the robot tooling abilities in the determined sequence of the robot tooling abilities and the alternate sequence of the robot tooling abilities;
enabling the user to select the alternate sequence of the robot tooling abilities through the user interface; and
manufacturing the product by the robot tooling in the factory using the alternate control codes.

4. The method of claim 2, the method further comprising:
determining, by the designer tool, a weight of the product made using the determined sequence of the robot tooling abilities and an alternative weight of the product made using the alternative sequence of the robot tooling abilities, wherein the weight of the product made using the determined sequence of the robot tooling abilities is higher than the alternative weight of the product made using the alternative sequence of the robot tooling abilities;
displaying on the user interface of the design computer the weight of the product and the alternative weight of the product;
enabling the user to select the alternate sequence of the robot tooling abilities through the user interface; and
manufacturing the product by the robot tooling in the factory using the alternate control codes.

5. The method of claim 2, the method further comprising:
determining, by the designer tool, a cost of the product made using the determined sequence of the robot tooling abilities and an alternative cost of the product made using the alternative sequence of the robot tooling abilities, wherein the cost of the product made using the determined sequence of the robot tooling abilities is greater than the alternative cost of the product made using the alternative sequence of the robot tooling abilities;
displaying on the user interface of the design computer the cost of the product and the alternative cost of the product;
enabling the user to select the alternate sequence of the robot tooling abilities through the user interface; and
manufacturing the product by the robot tooling in the factory using the alternate control codes.

6. The method of claim 1, the method further comprising:
analyzing, by the designer tool, a second product design of a second product having parts and assemblies and a second set of product requirements;
determining, by the designer tool, a second sequence of robot tooling abilities from the available robot tooling abilities for manufacturing the second product that meets the second set of product requirements;
determining, by the designer tool, second available tooling options for the robot tooling abilities that can be used to manufacture the second product that meets the second set of product requirements;
displaying on the user interface of the design computer the defined second sequence of the robot tooling abilities to manufacture the second product and the second available tooling options;

enabling the user to select some of the displayed second options through the user interface of the design computer;

creating, by the designer tool, second control codes for manufacturing the second product by the robot tooling in the factory using the second sequence of the robot tooling abilities and the selected second options;

simulating on the simulator a manufacture of the second product by virtual robot tooling using the second control codes;

verifying, by the simulator, that the second control codes provide for correct manufacture of the second product; and manufacturing the second product by the robot tooling in the factory using the second control codes in parallel with the manufacture of the product.

7. The method of claim 6, the method further comprising:

analyzing, by the designer tool, a third product design of a third product having parts and assemblies and a third set of product requirements;

determining, by the designer tool, a third sequence of robot tooling abilities from the available robot tooling abilities to manufacture the third product that meets the third set of product requirements;

determining, by the designer tool, third available tooling options for the robot tooling abilities that can be used to manufacture the third product that meets the third set of product requirements;

displaying on the user interface of the design computer the third sequence of the robot tooling abilities for manufacturing the third product and the third available manufacturing options;

enabling the user to select some of the displayed third options through the user interface of the design computer;

creating, by the designer tool, third control codes for manufacturing the third product by the robot tooling using the third sequence of the robot tooling abilities and the selected third options;

simulating on the simulator a manufacture of the third product by virtual robot tooling using the third control codes;

verifying, by the simulator, that the third control codes provide for correct manufacture of the third product; and manufacturing the third product by the robot tooling in the factory using the third control codes in parallel with the manufacture of the product and the second product.

8. The method of claim 1, the method further comprising:

receiving, by the designer tool, a modified product design and a set of modified product requirements for a modified product;

analyzing, by the designer tool, the modified product design and the set of modified product requirements;

determining, by the designer tool, a modified sequence of robot tooling abilities from the available robot tooling abilities for manufacturing the modified product that meets the set of modified product requirements;

determining, by the designer tool, modified tooling options for the robot tooling abilities that can be used to manufacture the modified product that meets the set of modified product requirements;

displaying on the user interface of the design computer the modified sequence of the robot tooling abilities for manufacturing the modified product and the modified tooling options;

enabling the user to select some of the displayed modified options through the user interface of the design computer;

creating, by the designer tool, modified control codes for manufacturing the modified product by the robot tooling using the modified sequence of the robot tooling abilities;

simulating on the simulator a manufacture of the modified product by virtual robot tooling using the modified control codes;

verifying, by the simulator, that the modified control codes provide for correct manufacture of the modified product; and manufacturing the modified product by the robot tooling in the factory using the modified control codes.

9. The method of claim 1, the method further comprising:

exporting a product manufacturing flow.

10. The method of claim 1, the method further comprising:

designing a factory configuration with a factory configurator on the design computer based upon the determined sequence of the robot tooling abilities for moving, machining and assembling the parts and the assemblies to manufacture the product that meets the set of product requirements.

11. The method of claim 10, the method further comprising:

exporting the factory configuration in a pre-determined format.

12. The method of claim 10, the method further comprising:

exporting the robot tooling abilities for moving, machining and assembling the parts and the assemblies to manufacture the product.

\* \* \* \* \*